United States Patent
Hayward

(10) Patent No.: US 10,977,943 B1
(45) Date of Patent: *Apr. 13, 2021

(54) ALERT NOTIFICATIONS UTILIZING BROADCASTED TELEMATICS DATA

(71) Applicant: State Farm Mutual Automobile Insurance Company, Bloomington, IL (US)

(72) Inventor: Gregory Hayward, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,984

(22) Filed: May 21, 2019

Related U.S. Application Data

(63) Continuation of application No. 15/901,384, filed on Feb. 21, 2018, now Pat. No. 10,373,497, which is a
(Continued)

(51) Int. Cl.
  *G08G 1/16* (2006.01)
  *G08G 1/01* (2006.01)
  (Continued)

(52) U.S. Cl.
  CPC .............. *G08G 1/16* (2013.01); *G06Q 40/08* (2013.01); *G08G 1/012* (2013.01); *G08G 1/0125* (2013.01); *G08G 1/0141* (2013.01); *G08G 1/052* (2013.01)

(58) Field of Classification Search
  CPC ............ G08G 1/166; G08G 1/16; G08G 1/12; G08G 1/0125; G06Q 40/08
  See application file for complete search history.

(56) References Cited

U.S. PATENT DOCUMENTS 6,437,688 B1 * 8/2002 Kobayashi ............ G01S 15/931
                                                              180/167
6,459,371 B1  10/2002 Pike
(Continued)

FOREIGN PATENT DOCUMENTS

JP   2012-126273 A   7/2012
WO   2018/102280 A1  6/2018

OTHER PUBLICATIONS

U.S. Appl. filed Aug. 21, 2018, Hayward; Gregory L., U.S. Appl. No. 10/055,982.
(Continued)

*Primary Examiner* — Santiago Garcia

(57) ABSTRACT

Geographic location data and telematics data may be collected in real-time by a mobile device within a vehicle, or the vehicle itself. The telematics data may indicate vehicle direction, speed, motion, etc., as well as traffic hazards in the surrounding environment. A remote server may receive the location and telematics data from two vehicles. If an anomalous or hazardous condition exists in the vicinity of the first vehicle, a geographic relationship with the second vehicle is determined, and if within a predetermined distance, an alert or alternate route for the second vehicle is determined and transmitted to the second vehicle. As a result, a negative impact or risk of collision caused by the anomalous condition on the second vehicle is alleviated. The amount of the insured's usage of the telematics data-based risk mitigation or prevision functionality may be used to calculate or adjust insurance premiums, rates, or discounts.

20 Claims, 6 Drawing Sheets

Related U.S. Application Data continuation of application No. 15/484,791, filed on Apr. 11, 2017, now Pat. No. 9,972,209, which is a continuation of application No. 14/989,946, filed on Jan. 7, 2016, now Pat. No. 9,679,487.

(60) Provisional application No. 62/250,286, filed on Nov. 3, 2015, provisional application No. 62/247,334, filed on Oct. 28, 2015, provisional application No. 62/232,050, filed on Sep. 24, 2015, provisional application No. 62/232,035, filed on Sep. 24, 2015, provisional application No. 62/232,065, filed on Sep. 24, 2015, provisional application No. 62/232,083, filed on Sep. 24, 2015, provisional application No. 62/232,075, filed on Sep. 24, 2015, provisional application No. 62/232,045, filed on Sep. 24, 2015, provisional application No. 62/232,090, filed on Sep. 24, 2015, provisional application No. 62/232,054, filed on Sep. 24, 2015, provisional application No. 62/232,097, filed on Sep. 24, 2015, provisional application No. 62/207,561, filed on Aug. 20, 2015, provisional application No. 62/204,749, filed on Aug. 13, 2015, provisional application No. 62/113,749, filed on Feb. 9, 2015, provisional application No. 62/105,468, filed on Jan. 20, 2015.

(51) Int. Cl.
 *G06Q 40/08* (2012.01)
 *G08G 1/052* (2006.01)

(56) References Cited

U.S. PATENT DOCUMENTS

| | | |
|---|---|---|
| 7,280,898 B2 | 10/2007 | Lesesky et al. |
| 7,421,334 B2 | 9/2008 | Dahlgren et al. |
| 8,117,049 B2 | 2/2012 | Berkobin et al. |
| 8,311,858 B2 | 11/2012 | Everett et al. |
| 8,731,768 B2 | 5/2014 | Fernandes et al. |
| 8,731,977 B1 | 5/2014 | Hardin et al. |
| 8,799,032 B2 | 8/2014 | Fernandes et al. |
| 8,805,707 B2 | 8/2014 | Schumann et al. |
| 8,862,486 B2 | 10/2014 | Cordova et al. |
| 8,922,393 B2 | 12/2014 | Ricci |
| 8,924,240 B2 | 12/2014 | Depura et al. |
| 8,935,036 B1 | 1/2015 | Christensen et al. |
| 9,014,911 B2 | 4/2015 | Ricci |
| 9,031,545 B1 | 5/2015 | Srey et al. |
| 9,037,394 B2 | 5/2015 | Fernandes et al. |
| 9,043,130 B2 | 5/2015 | Ricci |
| 9,046,374 B2 | 6/2015 | Ricci |
| 9,047,778 B1 * | 6/2015 | Cazanas .......... G08G 1/166 |
| 9,105,051 B2 | 8/2015 | Ricci |
| 9,111,316 B2 | 8/2015 | Fernandes et al. |
| 9,123,058 B2 | 9/2015 | Ricci |
| 9,129,449 B2 * | 9/2015 | Davidson .......... G07B 15/06 |
| 9,159,232 B2 | 10/2015 | Ricci |
| 9,164,957 B2 | 10/2015 | Hassib et al. |
| 9,176,924 B2 | 11/2015 | Ricci |
| 9,240,018 B2 | 1/2016 | Ricci |
| 9,355,423 B1 | 5/2016 | Slusar |
| 9,390,451 B1 | 7/2016 | Slusar |
| 9,398,423 B2 | 7/2016 | Cordova et al. |
| 9,421,864 B1 | 8/2016 | Srey et al. |
| 9,443,270 B1 | 9/2016 | Friedman et al. |
| 9,454,786 B1 | 9/2016 | Srey et al. |
| 9,558,520 B2 | 1/2017 | Peak et al. |
| 9,619,203 B2 | 4/2017 | Tamir et al. |
| 9,633,318 B2 | 4/2017 | Plante |
| 9,672,569 B2 | 6/2017 | Fernandes et al. |
| 9,672,571 B2 | 6/2017 | Fernandes et al. |
| 9,679,487 B1 | 6/2017 | Hayward |
| 9,783,159 B1 | 10/2017 | Potter et al. |
| 9,786,154 B1 | 10/2017 | Potter et al. |
| 9,841,767 B1 | 12/2017 | Hayward |
| 9,904,289 B1 | 2/2018 | Hayward |
| 9,911,159 B1 | 3/2018 | Srey et al. |
| 9,932,033 B2 | 4/2018 | Slusar et al. |
| 10,012,987 B2 | 7/2018 | Shem et al. |
| 10,023,114 B2 | 7/2018 | Adams et al. |
| 10,032,226 B1 | 7/2018 | Suizzo et al. |
| 10,037,578 B2 | 7/2018 | Bogovich et al. |
| 10,037,579 B2 | 7/2018 | Bogovich et al. |
| 10,037,580 B2 | 7/2018 | Bogovich et al. |
| 10,042,363 B1 | 8/2018 | Hayward |
| 10,042,364 B1 | 8/2018 | Hayward |
| 10,054,453 B1 | 8/2018 | Hayward |
| 10,055,982 B1 | 8/2018 | Hayward |
| 10,055,985 B1 | 8/2018 | Hayward |
| 10,074,139 B2 | 9/2018 | Bogovich et al. |
| 10,089,868 B1 | 10/2018 | Hayward |
| 10,096,038 B2 | 10/2018 | Ramirez et al. |
| 10,096,067 B1 | 10/2018 | Slusar |
| 10,096,070 B1 | 10/2018 | Slusar et al. |
| 10,109,016 B1 | 10/2018 | Saenglongma |
| 10,121,204 B1 | 11/2018 | Brandmaier et al. |
| 10,134,091 B2 | 11/2018 | Adams et al. |
| 10,157,422 B2 | 12/2018 | Jordan et al. |
| 10,169,822 B2 | 1/2019 | Jarvis et al. |
| 10,198,772 B2 | 2/2019 | Parameshwaran |
| 10,210,772 B2 | 2/2019 | Tamir et al. |
| 10,216,194 B1 | 2/2019 | Hayward |
| 10,216,195 B2 | 2/2019 | Switkes et al. |
| 10,217,169 B2 | 2/2019 | Schumann et al. |
| 10,229,462 B2 | 3/2019 | Bogovich et al. |
| 10,231,093 B2 | 3/2019 | Cordova et al. |
| 10,234,871 B2 | 3/2019 | Klaus et al. |
| 10,255,638 B2 | 4/2019 | Cote et al. |
| 10,255,639 B1 | 4/2019 | Friedman et al. |
| 10,317,223 B1 | 6/2019 | Hayward |
| 10,354,333 B1 | 7/2019 | Hayward |
| 10,360,636 B1 | 7/2019 | Kraft et al. |
| 10,380,699 B2 | 8/2019 | Fernandes et al. |
| 10,395,319 B1 | 8/2019 | Srey et al. |
| 10,395,320 B1 | 8/2019 | Srey et al. |
| 10,417,713 B1 | 9/2019 | Brandmaier et al. |
| 10,438,424 B2 | 10/2019 | Hassib et al. |
| 10,445,758 B1 | 10/2019 | Bryer et al. |
| 10,453,352 B1 | 10/2019 | Hayward |
| 10,509,414 B1 | 12/2019 | Hayward |
| 10,571,908 B2 | 2/2020 | Joyce et al. |
| 10,572,943 B1 | 2/2020 | Tye et al. |
| 10,634,507 B2 | 4/2020 | Krishnan et al. |
| 10,657,597 B1 | 5/2020 | Billman et al. |
| 10,664,918 B1 | 5/2020 | Slusar |
| 10,699,350 B1 | 6/2020 | Suizzo et al. |
| 10,726,495 B1 | 7/2020 | Saenglongma |
| 10,726,687 B2 | 7/2020 | Song |
| 10,733,673 B1 | 8/2020 | Slusar |
| 10,740,850 B1 | 8/2020 | Slusar |
| 10,755,566 B2 | 8/2020 | Tennent et al. |
| 10,775,179 B1 | 9/2020 | Hayward |
| 10,783,586 B1 | 9/2020 | Augustine et al. |
| 10,783,587 B1 | 9/2020 | Augustine et al. |
| 10,787,122 B2 | 9/2020 | Adams et al. |
| 10,796,369 B1 | 10/2020 | Augustine et al. |
| 10,803,525 B1 | 10/2020 | Augustine et al. |
| 10,803,529 B2 | 10/2020 | Adams et al. |
| 2005/0065711 A1 | 3/2005 | Dahlgren et al. |
| 2007/0054685 A1 * | 3/2007 | Kellum .......... G01S 13/931 455/517 |
| 2007/0159354 A1 * | 7/2007 | Rosenberg ...... G08G 1/0965 340/902 |
| 2010/0015963 A1 * | 1/2010 | Hesse .......... H04W 4/46 455/415 |
| 2010/0191391 A1 * | 7/2010 | Zeng .......... G01S 13/87 701/1 |
| 2010/0286864 A1 * | 11/2010 | Kawauchi .......... G08G 1/163 701/31.4 |
| 2010/0312466 A1 | 12/2010 | Katzer |
| 2011/0161116 A1 | 6/2011 | Peak |
| 2012/0101855 A1 | 4/2012 | Collins |

(56) References Cited

U.S. PATENT DOCUMENTS

| | | | |
|---|---|---|---|
| 2012/0303392 A1 | 11/2012 | Depura et al. | |
| 2013/0013347 A1 | 1/2013 | Ling et al. | |
| 2013/0013348 A1 | 1/2013 | Ling et al. | |
| 2013/0030642 A1* | 1/2013 | Bradley | G07C 5/085 701/32.2 |
| 2013/0090139 A1* | 4/2013 | McHenry | H04W 4/14 455/466 |
| 2013/0169812 A1 | 7/2013 | Lu et al. | |
| 2014/0046701 A1 | 2/2014 | Steinberg et al. | |
| 2014/0081675 A1 | 3/2014 | Ives et al. | |
| 2014/0142799 A1* | 5/2014 | Ferguson | G05D 1/00 701/23 |
| 2014/0309806 A1 | 10/2014 | Ricci | |
| 2014/0309870 A1 | 10/2014 | Ricci et al. | |
| 2014/0309880 A1 | 10/2014 | Ricci | |
| 2014/0309886 A1 | 10/2014 | Ricci | |
| 2014/0309891 A1 | 10/2014 | Ricci | |
| 2014/0310594 A1 | 10/2014 | Ricci et al. | |
| 2014/0310610 A1 | 10/2014 | Ricci | |
| 2014/0310739 A1 | 10/2014 | Ricci et al. | |
| 2014/0320260 A1* | 10/2014 | Van Wiemeersch | G06K 7/10069 340/5.61 |
| 2014/0330596 A1 | 11/2014 | Depura et al. | |
| 2015/0077236 A1* | 3/2015 | Le Masurier | G08G 1/163 340/435 |
| 2015/0127570 A1* | 5/2015 | Doughty | G06Q 10/00 705/325 |
| 2015/0145995 A1* | 5/2015 | Shahraray | H04L 67/12 348/148 |
| 2015/0179062 A1 | 6/2015 | Ralston et al. | |
| 2015/0232065 A1 | 8/2015 | Ricci et al. | |
| 2015/0262487 A1* | 9/2015 | Cazanas | B60W 30/09 701/301 |
| 2015/0266473 A1* | 9/2015 | Hayasaka | G08G 1/166 701/70 |
| 2015/0353014 A1* | 12/2015 | Li | G06K 9/00845 348/148 |
| 2016/0021178 A1* | 1/2016 | Liu | H04L 41/06 370/216 |
| 2016/0042644 A1 | 2/2016 | Velusamy | |
| 2016/0192108 A1 | 6/2016 | Chaudhary | |
| 2016/0205419 A1 | 7/2016 | Ricci et al. | |
| 2016/0232791 A1* | 8/2016 | Tosa | B60W 30/16 |
| 2016/0277601 A1* | 9/2016 | Seymour | B60R 1/00 |
| 2016/0334227 A1* | 11/2016 | Davidson | G06Q 10/04 |
| 2017/0021764 A1 | 1/2017 | Adams et al. | |
| 2017/0075701 A1 | 3/2017 | Ricci et al. | |
| 2017/0120906 A1* | 5/2017 | Penilla | G05D 1/0022 |
| 2017/0178498 A1* | 6/2017 | Mcerlean | G08G 1/166 |
| 2017/0337813 A1 | 11/2017 | Taylor | |
| 2018/0022327 A1* | 1/2018 | Kitagawa | B60T 7/12 180/275 |
| 2018/0096601 A1* | 4/2018 | Chow | G08G 1/166 |
| 2018/0144633 A1* | 5/2018 | Minemura | G08G 1/166 |
| 2018/0201263 A1 | 7/2018 | Slusar et al. | |

OTHER PUBLICATIONS

US. Appl. filed Aug. 21, 2018, Hayward; Gregory., U.S. Appl. No. 10/054,453.
U.S. Appl. No. 14/798,609, Methods of Providing Insurance Savings Based Upon Telematics and Anonymous Driver Data, filed Jul. 14, 2015.
U.S. Appl. No. 14/798,615, Methods of Providing Insurance Savings Based Upon Telematics and Driving Behavior Identification, filed Jul. 14, 2015.
U.S. Appl. No. 14/798,626, Methods of Providing Insurance Savings Based Upon Telematics and Usage-Based Insurance, filed Jul. 14, 2015.
U.S. Appl. No. 14/798,633, Methods of Providing Insurance Savings Based Upon Telematics and Insurance Incentives, filed Jul. 14, 2015.
U.S. Appl. No. 14/798,741, Methods of Determining Accident Cause and/or Fault Using Telematics Data, filed Jul. 14, 2015.
U.S. Appl. No. 14/798,745, Methods of Reconstructing an Accident Scene Using Telematics Data filed Jul. 14, 2015.
U.S. Appl. No. 14/798,750, Methods of Insurance Claim Buildup Detection Using Telematics Data, filed Jul. 14, 2015.
U.S. Appl. No. 14/798,757, Methods of Facilitating Emergency Assistance, filed Jul. 14, 2015.
U.S. Appl. No. 14/798,763, Methods of Intelligent Routing, filed Jul. 14, 2015.
U.S. Appl. No. 14/798,769, Methods of Theft Prevention or Mitigation, filed Jul. 14, 2015.
U.S. Appl. No. 14/798,770, Methods of Pre-Generating Insurance Claims, filed Jul. 14, 2015.
U.S. Appl. No. 14/989,946, Alert NotificationsUtilizing Broadcasted Telematics Data, filed Jan. 7, 2016.
U.S. Appl. No. 14/989,946, Nonfinal Office Action, dated Dec. 9, 2016.
U.S. Appl. No. 14/989,946, Notice of Allowance, dated Mar. 17, 2017.
U.S. Appl. No. 14/989,950, Advisory Action, dated Jun. 21, 2017.
U.S. Appl. No. 14/989,950, Broadcasting Telematics Data to Nearby Mobile Computing Devices, Vehicles, and Infrastructure, filed Jan. 7, 2016.
U.S. Appl. No. 14/989,950, Final Office Action, dated Apr. 19, 2017.
U.S. Appl. No. 14/989,950, Nonfinal Office Action, dated Nov. 18, 2016.
U.S. Appl. No. 14/989,950, Notice of Allowance, dated Sep. 12, 2017.
U.S. Appl. No. 14/989,979, Advisory Action, dated Jun. 26, 2017.
U.S. Appl. No. 14/989,979, Determining Abnormal Traffic Conditions from a Broadcast of Telematics Data Originating from Another Vehicle, filed Jan. 7, 2016.
U.S. Appl. No. 14/969,979, Final Office Action, dated Apr. 24, 2017.
U.S. Appl. No. 14/989,979, Final Office Action, dated Apr. 24, 2017.
U.S. Appl. No. 14/989,979, Nonfinal Office Action, dated Nov. 30, 2016.
U.S. Appl. No. 14/989,979, Notice of Allowance, dated Sep. 14, 2017.
U.S. Appl. No. 14/989,990, Taking Corrective Action Based Upon Telematics Data Broadcast from Another Vehicle, filed on Jan. 7, 2016.
U.S. Appl. No. 14/990,056, Advisory Action, dated Jul. 6, 2017.
U.S. Appl. No. 14/990,056, Analyzing Telematics Data to Determine Travel Events and Corrective Actions, filed Jan. 7, 2016.
U.S. Appl. No. 14/990,056, Final Office Action, dated Apr. 21, 2017.
U.S. Appl. No. 14/990,056, Nonfinal Office Action, dated Dec. 1, 2016.
U.S. Appl. No. 14/990,056, Notice of Allowance, dated Sep. 13, 2017.
U.S. Appl. No. 14/990,073, Providing Insurance Discounts Based Upon Usage of Telematics Data-Based Risk Mitigation and Prevention Functionality, filed Jan. 7, 2016.
U.S. Appl. No. 14/990,116, Notice of Allowance, dated Sep. 13, 2017.
U.S. Appl. No. 14/990,116, Advisory Action, dated Jun. 28, 2017.
U.S. Appl. No. 14/990,116, Determining Corrective Actions Based Upon Broadcast of Telematics Data Originating From Another Vehicle, filed Jan. 7, 2016.
U.S. Appl. No. 14/990,116, Final Office Action, dated Apr. 19, 2017.
U.S. Appl. No. 14/990,116, Nonfinal Office Action, dated Nov. 25, 2016.
U.S. Appl. No. 14/990,121, Advisory Action, dated Jul. 17, 2017.
U.S. Appl. No. 14/990,121, Facilitating Safer Vehicle Travel Utilizing Telematics Data, filed Jan. 7, 2016.
U.S. Appl. No. 14/990,121, Final Office Action, dated Apr. 19, 2017.
U.S. Appl. No. 14/990,121, Nonfinal Office Action, dated Dec. 15, 2016.
U.S. Appl. No. 14/990,121, Notice of Allowance, dated Oct. 10, 2017.
U.S. Appl. No. 14/990,139, Final Office Action, dated Apr. 19, 2017.
U.S. Appl. No. 14/990,139, Nonfinal Office Action, dated Nov. 18, 2016.

(56) References Cited

OTHER PUBLICATIONS

U.S. Appl. No. 14/990,139, Notice of Allowance, dated Aug. 14, 2017.
U.S. Appl. No. 14/990,139, Using Train Telematics Data to Reduce Accident Risk, filed Jan. 7, 2016.
U.S. Appl. No. 14/990,165, Final Office Action, dated Apr. 19, 2017.
U.S. Appl. No. 14/990,165, Nonfinal Office Action, dated Nov. 23, 2016.
U.S. Appl. No. 14/990,165, Notice of Allowance, dated Aug. 10, 2017.
U.S. Appl. No. 14/990,165, Using Train Telematics Data to Provide Information in One or More Vehicles to Reduce Accident Risk, filed Jan. 7, 2016.
U.S. Appl. No. 14/990,209, Corrected Notice of Allowability, dated Aug. 28, 2017.
U.S. Appl. No. 14/990,209, Final Office Action, dated Apr. 20, 2017.
U.S. Appl. No. 14/990,209, Nonfinal Office Action, dated Nov. 18, 2016.
U.S. Appl. No. 14/990,209, Notice of Allowance, dated Aug. 16, 2017.
U.S. Appl. No. 14/990,209, Using Emergency Response System (EMS) Vehicle Telematics Data to Reduce Accident Risk, filed Jan. 7, 2016.
U.S. Appl. No. 14/990,228, Broadcasting Information Related to Hazards Impacting Vehicle Travel, filed Jan. 7, 2016.
U.S. Appl. No. 14/990,228, Final Office Action, dated Apr. 20, 2017.
U.S. Appl. No. 14/990,228, Nonfinal Office Action, dated Dec. 15, 2016.
U.S. Appl. No. 14/990,228, Notice of Allowance, dated Aug. 31, 2017.
U.S. Appl. No. 15/484,791, Alert Notifications Utilizing Broadcasted Telematics Data, filed Apr. 11, 2017
U.S. Appl. No. 15/484,791, Nonfinal Office Action, dated Oct. 18, 2017.
U.S. Appl. No. 15/676,460, Methods of Theft Prevention or Mitigation, filed Aug. 14, 2017.
U.S. Appl. No. 15/676,470, Methods of Facilitating Emergency Assistance, filed Aug. 14, 2017.
U.S. Appl. No. 15/787,293, Broadcasting Telematics Data to Nearby Mobile Computing Devices, Vehicles, and Infrastructure, filed Oct. 18, 2017.
U.S. Appl. No. 15/787,305, Determining Abnormal Traffic Conditions From a Broadcast of Telematics Data Originating From Another Vehicle, filed Oct. 18, 2017.
U.S. Appl. No. 15/787,311, Analyzing Telematics Data to Determine Travel Events and Corrective Actions, Oct. 18, 2017.
U.S. Appl. No. 15/787,317, Determining Corrective Actions Based Upon Broadcast of Telematics Data Originating From Another Vehicle, Oct. 18, 2017.
U.S. Appl. No. 15/798,019, Using Train Telematics Data to Reduce Accident Risk, filed Oct. 30, 2017.
U.S. Appl. No. 15/798,062, Using Train Telematics Data to Provide Information in One or More Vehicles to Reduce Accident Risk, filed Oct. 30, 2017.
U.S. Appl. No. 15/798,093, Using Emergency Response System (EMS) Vehicle Telematics Data to Reduce Accident Risk, filed Oct. 30, 2017.
U.S. Appl. No. 15/798,107, Broadcasting Information Related to Hazards Impacting Vehicle Travel, filed Oct. 30, 2017.

* cited by examiner

ALERT NOTIFICATIONS UTILIZING BROADCASTED TELEMATICS DATA

CROSS REFERENCE TO RELATED APPLICATIONS

The present application is a continuation of U.S. patent application Ser. No. 15/901,384, filed Feb. 21, 2018 and entitled "Alert Notifications utilizing Broadcasted Telematics Data, which is a continuation of U.S. patent application Ser. No. 15/484,791 (now U.S. Pat. No. 9,972,209), entitled "Alert Notifications Utilizing Broadcasted Telematics Data," filed on Apr. 11, 2017, which is a continuation of U.S. patent application Ser. No. 14/989,946 (now U.S. Pat. No. 9,679,487), entitled "Alert Notifications Utilizing Broadcasted Telematics Data," filed on Jan. 7, 2016, which claims the benefit of (1) U.S. Provisional Patent Application No. 62/105,468, entitled "Broadcasting Telematics Data. To Nearby Mobile computing devices, Vehicles, And infrastructure," filed Jan. 20, 2015, (2) U.S. Provisional Patent Application No. 62/113,749, entitled "Broadcasting Telematics Data To Nearby Mobile computing devices, Vehicles, And Infrastructure," filed Feb. 9, 2015, (3) U.S. Provisional Patent Application No. 62/204,749, entitled "Broadcasting Telematics Data To Nearby Mobile computing devices, Vehicles, And Infrastructure," filed Aug. 13, 2015. (4) U.S. Provisional Patent Application No. 62/207,561, entitled "Generating Alert Notifications By Broadcasting Telematics Data To Nearby Mobile computing devices, Vehicles, And Infrastructure," filed Aug. 20, 2015, (5) U.S. Provisional Patent Application No. 62/232,035 entitled "Generating Alert Notifications By Broadcasting Telematics Data To Nearby Mobile computing devices, Vehicles, And Infrastructure," filed Sep. 24, 2015, (6) U.S. Provisional Patent Application No. 62/232,045, entitled "Generating Alert Notifications By Broadcasting Telematics Data To Nearby Mobile computing devices, Vehicles, And Infrastructure," filed Sep. 24, 2015, (7) U.S. Provisional Patent Application No. 62/232,050, entitled "Determining Abnormal Traffic Conditions From A Broadcast Of Telematics Data. Originating From Another Vehicle," filed Sep. 24, 2015, (8) U.S. Provisional Patent Application No. 62/232,054, entitled "Taking Corrective Action Based Upon Telematics Data Broadcast From Another Vehicle," filed Sep. 24, 2015, (9) U.S. Provisional Patent Application No. 62/232,065, entitled "Analyzing Telematics Broadcast To Determine Travel Events And Corrective Actions," filed Sep. 24, 2015, (10) U.S. Provisional Patent Application No. 62/232,075, entitled "Providing Insurance Discounts Based Upon Usage Of Telematics Data-Based Risk Mitigation And Prevention Functionality," filed Sep. 24, 2015. (11) U.S. Provisional Patent Application No. 62/232,083, entitled "Determining Corrective Actions Based Upon Broadcast Of Telematics Data Originating From Another Vehicle," filed Sep. 24, 2015, (12) U.S. Provisional Patent Application No. 62/232,090, entitled "Determining Corrective Actions Based Upon Telematics Data Broadcast From Another Vehicle," filed Sep. 24, 2015, (13) U.S. Provisional Patent Application No. 62/232,097, entitled "Generating Alert Notifications By Broadcasting Train Telematics Data To Nearby Mobile computing device s, Vehicles, And Infrastructure," filed Sep. 24, 2015, (14) U.S. Provisional Patent Application No. 62/247,334, entitled "Generating Alert Notifications By Broadcasting Train Telematics Data To Nearby Mobile computing device s, Vehicles, And Infrastructure," filed Oct. 28, 2015, and (15) U.S. Provisional Patent Application No. 62/250,286, entitled "Generating Alert Notifications By Broadcasting Train Telematics Data To Nearby Mobile computing devices, Vehicles, And Infrastructure," filed Nov. 3, 2015. The disclosure of each of which is hereby expressly incorporated by reference herein in its entirety.

FIELD OF THE DISCLOSURE

The present disclosure generally relates to generating alert notifications and, more particularly, to generating alert notifications based upon an analysis of collected telematics data, which may be used by other drivers.

BACKGROUND

Conventional telematics devices may collect certain types of data regarding vehicle operation. However, conventional telematics devices and data gathering techniques may have several drawbacks.

BRIEF SUMMARY

In one aspect, telematics data and/or geographic location data may be collected, monitored, measured, and/or generated by one or more computing devices associated with a vehicle. The telematics data may include various metrics that indicate the direction, speed, and/or motion of the vehicle in which the data is associated. The geographic location data may include a geographic location of the vehicle, such as latitude and longitude coordinates, for example. The one or more computing devices may include a mobile computing device positioned within the vehicle, an on-board computer integrated within the vehicle, and/or a combination of these devices working in conjunction with one another. The one or more computing devices may broadcast the telematics data and/or the geographic location data to one or more other devices.

The telematics data and/or the geographic location data may be received and/or processed by one or more other computing devices to determine whether an anomalous condition exists, such as a traffic accident, for example. These one or more other computing devices may be external computing devices (e.g., a remote server), another mobile computing device, a smart traffic infrastructure device (e.g., a smart traffic light), etc. If an anomalous condition is detected, the geographic location of the vehicle associated with the telematics data may be used as a condition to decide whether to generate an alert at (or send an alert notification to) the one or more other computing devices associated with nearby vehicles.

In one aspect, a computer-implemented method for sending alerts indicative of anomalous conditions may be provided. A method may include: (1) receiving, by one or more processors, first and second geographic location data indicative of a geographic location of a first and a second vehicle, respectively; (2) receiving, by one or more processors, first and second telematics data indicative of a motion of the first and the second vehicle, respectively; (3) determining, by one or more processors, whether an anomalous condition is present at, and/or in the vicinity of, the geographic location of the first vehicle based upon the first telematics data; (4) calculating, by one or more processors, a geographic relationship between the first vehicle and the second vehicle based upon the first and the second geographic location data; and/or (5) sending, by one or more processors, an alert indicative of the anomalous condition to the second vehicle (and/or an alternate route avoiding the anomalous condition) when (i) the one or more processors determine that the anomalous condition is present at, and/or in the vicinity of, the geographic location of the first vehicle, and/or (ii) the geographic relationship between the first and second vehicles satisfies a threshold distance condition to facilitate driving by a driver of the second vehicle utilizing telematics data associated with the first vehicle, and/or alleviating the risk of an accident or collision involving the second vehicle due to the anomalous condition. The threshold distance condition may include, for example, the second vehicle and the first vehicle being within a threshold distance of one another. The method may include additional, fewer, or alternate actions, including those discussed elsewhere herein.

In another aspect, a non-transitory, tangible computer-readable medium storing machine readable instructions for generating alerts is described that, when executed by a processor, cause the processor to: (1) receive first and second geographic location data indicative of a geographic location of a first and a second vehicle, respectively; (2) receive first and second telematics data indicative of a motion of the first and the second vehicle, respectively; (3) determine whether an anomalous condition is present at, and/or in the vicinity of, the geographic location of the first vehicle based upon the first telematics data; (4) calculate a geographic relationship between the first vehicle and the second vehicle based upon the first and the second geographic location data; and/or (5) send an alert indicative of the anomalous condition to the second vehicle (and/or an alternate route avoiding the anomalous condition) when (i) the one or more processors determine that the anomalous condition is present at, and/or in the vicinity of the geographic location of the first vehicle, and/or (ii) the geographic relationship between the first and second vehicles satisfies a threshold distance condition to facilitate driving by a driver of the second vehicle utilizing telematics data associated with the first vehicle, and/or alleviating the risk of an accident or collision involving the second vehicle due to the anomalous condition. The threshold distance condition may include, for example, the second vehicle and the first vehicle being within a threshold distance of one another. The non-transitory, tangible computer-readable medium may include additional, fewer, or alternate instructions, including those discussed elsewhere herein.

In yet another aspect, a first mobile computing device is described that may be located within a first vehicle and include (1) a communication unit configured to receive (i) telematics data from a second mobile computing device indicative of a motion of a second vehicle in which the second mobile computing device is located, and/or (ii) geographic location data indicative of a location of the second vehicle; and (2) a processor configured to: (i) determine whether an anomalous traffic condition is present at the geographic location of, and/or in vicinity of, the second vehicle based upon the geographic location data; (ii) determine a geographic location of the first mobile computing device; (iii) calculate a geographic relationship between the first vehicle and the second vehicle based upon the geographic location data and the geographic location of the first mobile computing device; and/or (iv) generate an alert indicative of the anomalous traffic condition (and/or alternate route avoiding the anomalous condition) when the processor determines that the anomalous condition is present at the geographic location of, and/or in the vicinity of the second vehicle, and/or the geographic relationship between the first and second vehicles satisfies a threshold distance condition to facilitate safer driving by a driver of the first vehicle based upon telematics data associated with the second vehicle, and/or alleviating the risk of an accident or collision involving the second vehicle due to the anomalous condition. The threshold distance condition may include, for example, the second vehicle and the first vehicle being within a threshold distance of one another. The mobile computing device may include additional, fewer, or alternate components and/or functionality, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
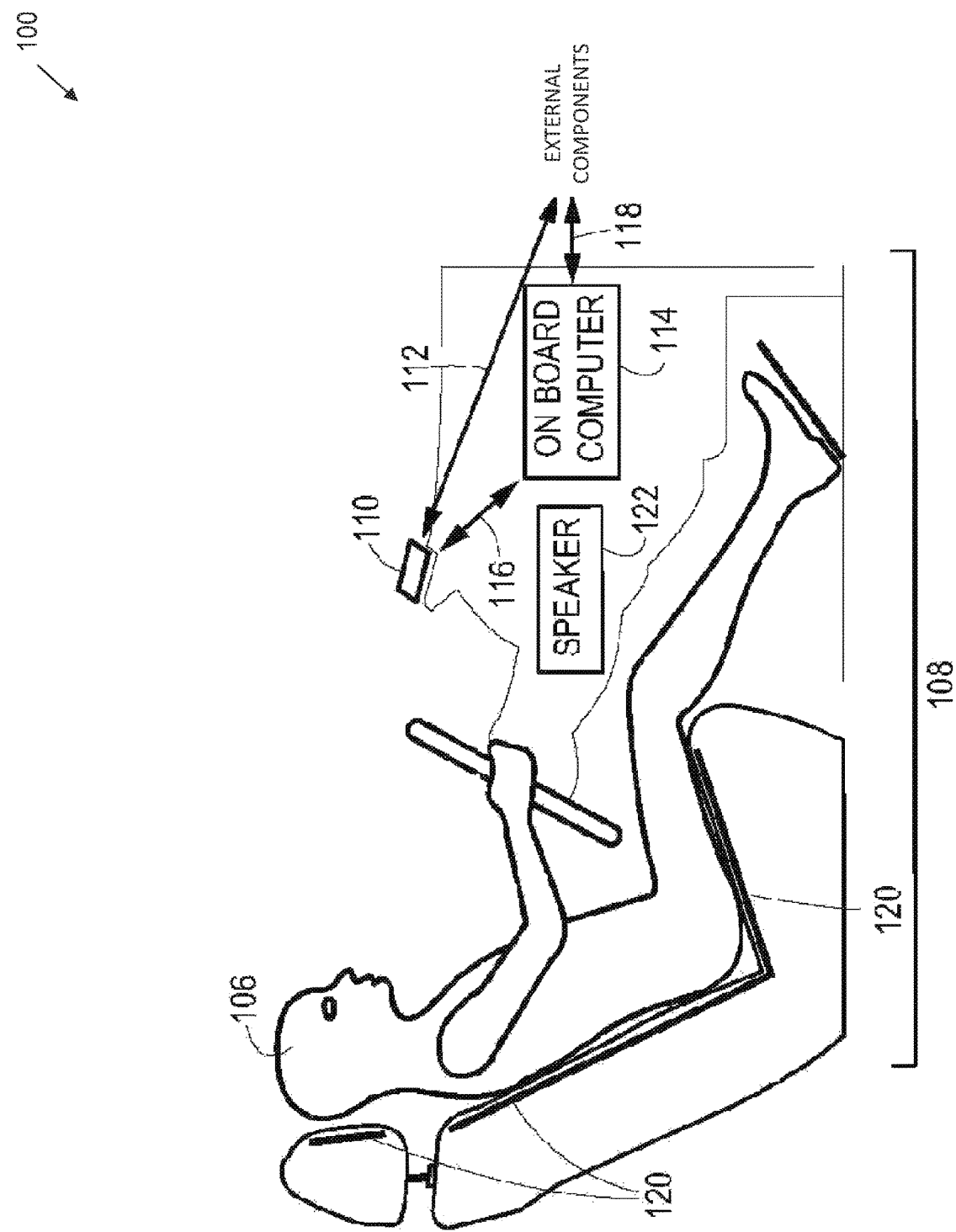
FIG. 1 illustrates a block diagram of an exemplary telematics collection system 100 in accordance with an exemplary aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

The present embodiments relate to, inter alia, determining whether an anomalous condition is detected at the location of a vehicle using one or more computing devices within or otherwise associated with the vehicle. If the detected anomalous condition may impact or affect another vehicle on the road, embodiments are described to generate and/or send alert notifications to other vehicles that may be so affected. As further described throughout the disclosure, the process of detecting anomalous conditions and whether they apply to other vehicles may be performed through an analysis geographic location data and/or telematics data broadcasted from one or more computing devices within or otherwise associated with one or more respective vehicles.

The present embodiments may relate to collecting, transmitting; and/or receiving telematics data; and may include a mobile device, a vehicle-mounted processor, computer server, web pages, applications, software modules, user interfaces, interactive display screens, memory units, and/or other electronic, electrical, and/or wireless communication equipment configured to provide the functionality discussed herein. As compared with the prior art, the present embodiments include specifically configured computing equipment that provide for an enhanced method of collecting telematics and/or other vehicle/driving conditions related data, and performing certain actions based upon the data collected. Using the telematics and/or other data collected, in conjunction with the novel techniques discussed herein, recommendations and/or travel/driving guidance may be provided to remote vehicles and/or drivers.

The present embodiments may solve one or more technical problems related to (1) vehicle safety, and/or (2) vehicle navigation by using solutions or improvements in another technological field, namely telematics. Vehicle safety and vehicle navigation is often impacted by short-term traffic events that occur with little or no warning. For instance, vehicle accidents may be caused by road construction, other vehicle accidents, traffic being temporarily re-routed, unexpected bad weather, other drivers or vehicles, etc.

To address these and other problems, telematics data (and/or driver behavior or vehicle information) may be captured in real-time, or near real-time, by a mobile device of a vehicle driver (or passenger). The mobile device may be specifically configured for gathering, collecting, and/or generating telematics and/or other data as a vehicle is traveling.

For instance, the mobile device may be equipped with (i) various sensors and/or meters capable of generating telematics data (GPS unit, speed sensor, speedometer, odometer, gyroscope, compass, accelerometer, etc.) and/or (ii) an application, such as a Telematics Data Application or Telematics "App," that includes computer instructions and/or software modules stored in a non-transitory memory unit that control collecting and generating telematics and/or other data. The mobile device and/or the application (or Telematics App) may provide a software module, user interface, and/or interactive display screen configured to facilitate the data collection. The mobile device and/or Telematics App executing thereon may be configured to prepare or otherwise format the telematics and/or other data collected or generated for transmission (via wireless communication and/or data transmission) to a mobile device of a second driver, a remote server, another (smart) vehicle, and/or smart infrastructure—all of which may be equipped with its own Telematics App or other telematics related applications. The Telematics App may include other functionality, including the mobile device functionality discussed elsewhere herein.

Alternatively, the mobile device may remotely access a web page, such as via wireless communication with a remote server. The web page may provide the mobile device with the functionality to collect the telematics and/or other data as the vehicle is moving. Additionally or alternatively, the web page may allow the mobile device to upload or transmit data in real-time, or near real-time, to a mobile device of a second driver, a remote server, smart infrastructure, and/or another (smart) vehicle.

Additionally or alternatively, a smart vehicle controller or processor may be configured with the same functionality as that of the mobile device described above. For instance, a smart vehicle controller may include an application, software module; or computer instructions that provide for the telematics and/or other data collection and generation functionality discussed herein. The smart vehicle controller may be in wired or wireless communication with various ("smart" or "dumb") vehicle-mounted meters, sensors, and/or detectors, such as speedometers; speed sensors, compasses, gyros, accelerometers, etc. that collect and/or generate telematics data and/or other data detailing or associated with vehicle operation, and/or driving or driver behavior.

In one aspect, by solving problems with collecting telematics data and/or other data associated with driver behavior and/or vehicle operation or performance, problems with vehicle navigation and/or vehicle operation may be resolved. For instance, telematics data associated with a first vehicle may be collected in real-time by a mobile device of a first driver. The mobile device may be specifically configured to gather or generate telematics and/or other driver/vehicle data in real-time as the vehicle is traveling, such as via a Telematics App running on the mobile device. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers; etc.); the telematics (and/or data) data collected may indicate such.

The mobile device itself (and/or Telematics App) may be configured to identify the type of traffic event and transmit the type of traffic event to other mobile devices, a remote server, smart vehicles, and/or smart infrastructure. In one embodiment, the mobile device (and/or Telematics App) may be in wireless communication with a smart vehicle control system of the vehicle, and the smart vehicle control system may transmit the telematics and/or other data, and/or any associated warnings, to a remote server, and/or roadside smart infrastructure or nearby mobile device or vehicles of other drivers (such as to conserve battery power of the mobile device).

Alternatively, the mobile device (and/or Telematics App) may transmit the telematics and/or other data collected via wireless communication and/or data transmission to a second computing device—such as a second mobile device (or another driver), a second and smart vehicle, a remote server, and/or road side infrastructure (smart street signs or road posts, smart toll booths, etc.), After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

In one embodiment, a telematics application or software module (e.g., the Telematics App as discussed herein) may be designed to communicate with smart vehicles and smart infrastructure. An advantage of this is that for a vehicle owner that does not have a "smart" vehicle with wireless communication technology, the application and/or software module deployed on a smart phone or other mobile device may communicate with smart vehicles and infrastructure (and/or remote servers and other mobile devices). The telematics application and/or software module may be programmed to provide voice alerts: such as on a two lane road "do not pass-a vehicle is approaching" or "high speed vehicle is approaching to your left (or right);" "traffic light will turn in 10 seconds," "turn left to find an open parking space;" "traffic is stopped 1.5 miles ahead;" "traffic has slowed to 20 mph 1.5 miles (or 2 blocks) ahead;" "recommended speed for turn ahead is 30 mph;" and/or "ice on bridge (or ramp) ahead."

As an example, a first mobile device may be traveling in a vehicle. The first mobile device may collect telematics data and/or other data, such as via a telematics application running on one or more processors mounted within the first mobile device. The first mobile device (and/or the telematics application) may detect a travel event from the data collected. For instance, the first mobile device (and/or the telematics application executing thereon) may determine that the vehicle is located on the highway, but the vehicle is moving slower than the posted speed limit. The first mobile device (and/or the telematics application) may then transmit the data collected and/or an associated message via wireless communication or data transmission to smart roadside infrastructure and/or nearby vehicles (or a second mobile device traveling within a nearby and second vehicle). The second mobile device (and/or a telematics application running thereon) may then, using the data received and/or message received from the first mobile device, generate an audible or visual warning or alert of the travel event, such as "Warning, congestion ahead," and/or "Recommend taking Exit 10 and traveling on Highway 12 for 5 miles until Exit 11 to avoid the congestion ahead." The second mobile device (and/or associated telematics application) may also be able to compare locations of the travel event with the current location of the second vehicle to determine if the travel event poses a potential obstacle to the second vehicle reaching its destination without interruption. Thus, the telematics data collected using a first mobile device (and/or a telematics application) and associated with a first driver may be used to alert a second driver (associated with the second mobile device) of a travel event and/or re-route the second vehicle to facilitate safer vehicle travel for the second driver and vehicle.

In one aspect, a mobile device (and/or the telematics application) may compare a vehicle's traveling speed with a known posted speed limit. If the vehicle's speed is below or above the posted speed by a certain threshold, for example, 10 or 20 miles-per-hour, then the mobile device may generate a warning and transmit the warning to roadside infrastructure and/or nearby mobile devices or vehicles. For example, the message may state "Slow moving vehicle in right hand lane ahead," "High speed vehicle approaching from rear;" And/or "High speed vehicle approaching from ahead."

Other messages or alerts that may be generated from mobile devices (and/or telematics applications executing thereon), smart vehicle controllers, remote servers, and/or smart infrastructure and transmitted to a mobile device of a driver (and/or smart vehicle) may include "Construction 1 mile ahead;" "Rain (or Snow) 5 miles ahead;" "Detour 2 blocks ahead," "Traffic light directly ahead will change from Green to Red starting in 5 seconds;" "Stranded vehicle on right side of road half a mile ahead;" "Recommend turning right at next intersection to avoid travel event 3 blocks ahead;" and/or other travel or traffic event-related messages.

An insurance provider may collect an insured's usage of the vehicle safety functionality provided herein, such as at an insurance provider remote server and/or via a mobile device application. Based upon an individual's usage and/or taking travel recommendations, such as travel recommendations that reduce or lower risk and/or enhance driver or vehicle safety, insurance policies (such as vehicle or life insurance policies) may be adjusted, generated, and/or updated. The insurance provider remote server may calculate, update, and/or adjust insurance premiums, rates, discounts, points, programs, etc., such as adjusting an insurance discount or premium based upon the insured having the functionality discussed herein and/or the amount that the insured uses the functionality discussed herein. The updated insurance policies and/or premiums, rates, discounts, etc. may be communicated to insurance customers for their review, modification, and/or approval—such as via wireless communication or data transmission from a remote server to a mobile device or the insured.

Telematics and Vehicle Navigation

In one aspect, by solving problems with collecting telematics data and/or other data associated with driver behavior and/or vehicle operation or performance, problems with vehicle navigation and/or vehicle operation may be resolved. For instance, telematics data associated with a first vehicle may be collected in real-time by a mobile device of a first driver. The mobile device may be specifically configured to gather or generate telematics and/or other driver/vehicle data in real-time as the vehicle is traveling. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers, etc.), the telematics (and/or data) data collected may indicate such.

The mobile device itself may be configured to identify the type of traffic event and transmit the type of traffic event to other mobile devices, a remote server, smart vehicles, and/or smart infrastructure. In one embodiment, the mobile device may be in wireless communication with a smart vehicle control system of the vehicle, and the smart vehicle control system may transmit the telematics and/or other data, and/or any associated warnings, to a remote server, and/or roadside smart infrastructure or nearby mobile device or vehicles of other drivers (such as to conserve battery power of the mobile device).

Additionally or alternatively, the mobile device may transmit the telematics and/or other data collected via wireless communication and/or data transmission to a second computing device—such as a second mobile device (or another driver), a second and smart vehicle, a remote server, and/or road side infrastructure (smart street signs or road posts, smart toll booths, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

Exemplary Telematics Collection System

FIG. 1 illustrates a block diagram of an exemplary telematics collection system 100 in accordance with an exemplary aspect of the present disclosure. In some aspects, telematics collection system 100 may include hardware and software applications configured to measure, calculate, generate, and/or collect geographic location data and/or telematics data indicative of the speed, direction, and/or motion of vehicle 108. Additionally or alternatively, telematics collection system 100 may include hardware and software applications configured to receive and process geographic location data and/or telematics data sent from another telematics collection system, to determine whether an anomalous condition has been detected, whether to generate an alert, and/or whether to send an alert notification. Telematics collection system 100 may include various data communication channels for facilitating data communications between the various hardware and software components and/or communications with one or more external components.

To accomplish this, telematics collection system 100 may include any suitable number of computing devices, such as mobile computing device 110 and/or on-board computing device 114, for example. These computing devices may be disposed within vehicle 108, permanently installed in vehicle 108, or removably installed in vehicle 108.

In the present aspects, mobile computing device 110 may be implemented as any suitable computing or mobile device, such as a mobile device (e.g., smartphone, tablet, laptop, wearable electronics, phablet, pager, personal digital assistant (PDA), smart glasses, smart watch or bracelet, etc.), while on-board computer may implemented as a general-use on-board computer or processor(s) installed by the manufacturer of vehicle 108 or as an aftermarket modification to vehicle 108, for example. In various aspects, mobile computing device 110 and/or on-board computer 114 may be a thin-client device configured to outsource any suitable portion of processing via communications with one or more external components.

On-board computer 114 may supplement one or more functions performed by mobile computing device 110 described herein by, for example, sending information to and/or receiving information from mobile computing device 110. Mobile computing device 110 and/or on-board computer 114 may communicate with one or more external components via links 112 and 118, respectively. Additionally, mobile computing device 110 and on-board computer 114 may communicate with one another directly via link 116.

In one aspect, mobile computing device 110 may be configured with suitable hardware and/or software (e.g., one or more applications, programs, files, etc.) to determine a geographic location of mobile computing device 110 and, hence, vehicle 108, in which it is positioned. Additionally or alternatively, mobile computing device 110 may be configured with suitable hardware and/or software to monitor, measure, generate, and/or collect one or more sensor metrics as part of the telematics data. Mobile computing device 110 may be configured to broadcast the geographic location data and/or the one or more sensor metrics to one or more external components.

In some aspects, the external components may include another mobile computing device substantially similar to or identical to mobile computing device 110. In accordance with such aspects, mobile computing device 110 may additionally or alternatively be configured to receive geographic location data and/or sensor metrics broadcasted from another mobile computing device, the details of which are further discussed below. Mobile computing device 110 may be configured to determine, upon receiving the geographic location data and/or sensor metrics, whether an anomalous condition exists at the geographic location indicated by the geographic location data. If so, mobile computing device 110 may be configured to generate one or more audio and/or video alerts indicative of the determined anomalous condition.

On-board computer 114 may be configured to perform one or more functions otherwise performed by mobile computing device 110. However, on-board computer 114 may additionally be configured to obtain geographic location data and/or telematics data by communicating with one or more vehicle sensors that are integrated into vehicle 108. For example, on-board computer 114 may obtain geographic location data via communication with a vehicle-integrated global navigation satellite system (GNSS). To provide additional examples, on-board computer 114 may obtain one or more metrics related to the speed, direction, and/or motion of vehicle 108 via any number of suitable sensors, such as speedometer sensors, braking sensors, airbag deployment sensors, crash detection sensors, etc.

In one aspect, mobile computing device 110 and/or on-board computer 114 may operate independently of one another to generate geographic location data and/or telematics data, to receive geographic location data and/or telematics data broadcasted from another telematics collection system, to determine whether to generate one or more alerts, and/or to generate one or more alert notifications. In accordance with such aspects, telematics collection system 100 may include mobile computing device 110 but not on-board computer 114, and vice-versa.

In other aspects, mobile computing device 110 and/or on-board computer 114 may operate in conjunction with one another to generate geographic location data and/or telematics data, to receive geographic location data and/or telematics data broadcasted from another telematics collection system, to determine whether to generate one or more alerts, and to generate one or more alert notifications. In accordance with such aspects, telematics collection system 100 may include both mobile computing device 110 and on-board computer 114. Mobile computing device 110 and on-board computer 114 may share any suitable portion of processing between one another to facilitate the functionality described herein.

Upon receiving notification alerts from another telematics collection system, aspects include telematics collection system 100 generating alerts via any suitable audio, video, and/or tactile techniques. For example, alerts may be generated via a display implemented by mobile computing device 110 and/or on-board computer 114. To provide another example, a tactile alert system 120 (e.g., a seat that can vibrate) may be configured to generate tactile alerts to a vehicle operator 106 when commanded by mobile computing device 110 and/or on-board computer 114. To provide another example, audible alerts may be generated via a speaker 122, which may be part of vehicle 108's integrated speaker system, for example.

Although telematics collection system 100 is shown in FIG. 1 as including one mobile computing device 110 and one on-board computer 114, various aspects include telematics collection system 100 implementing any suitable number of mobile computing devices 110 and/or on-board computers 114.

Exemplary Telematics Alert Notification System

Figure 2:
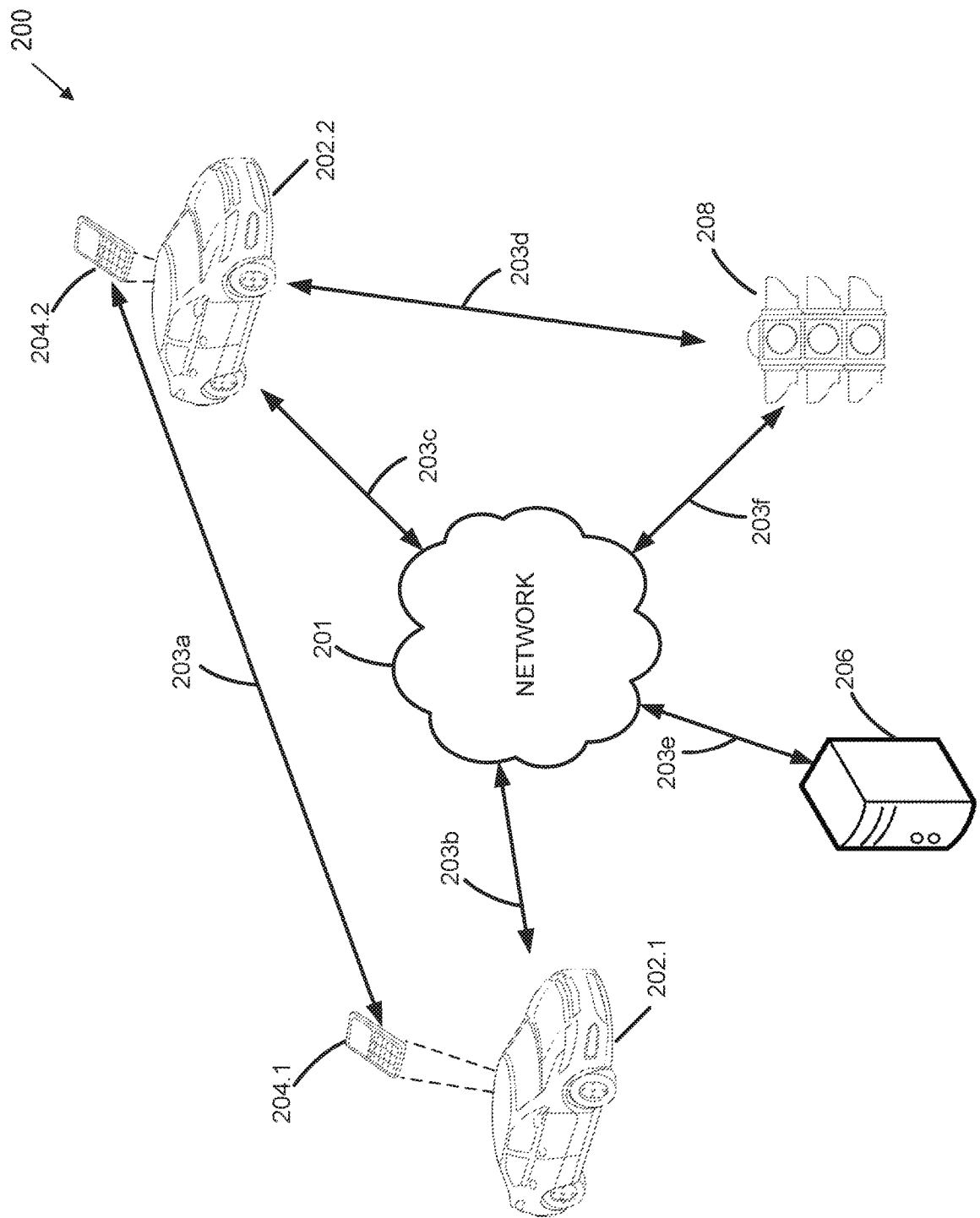
FIG. 2 illustrates a block diagram of an exemplary alert notification system 200 in accordance with an exemplary aspect of the present disclosure.

FIG. 2 illustrates a block diagram of an exemplary alert notification system 200 in accordance with an exemplary aspect of the present disclosure. In one aspect, alert notification system 200 may include a network 201, N number of vehicles 202.1-202.N and respective mobile computing devices 204.1-204.N, an external computing device 206, and/or an infrastructure component 208. In one aspect, mobile computing devices 204 may be an implementation of mobile computing device 110, as shown in FIG. 1, while vehicles 202 may be an implementation of vehicle 108, also shown in FIG. 1. Each of vehicles 202.1 and 202.2 may have an associated on-board computer, which is not shown in FIG. 2 for purposes of brevity, but may be an implementation of on-board computer 114, as shown in FIG. 1. Each of vehicles 202.1 and 202.2 may be configured for wireless inter-vehicle communication, such as vehicle-to-vehicle (V2V) wireless communication and/or data transmission.

Although alert notification system 200 is shown in FIG. 2 as including one network 201, two mobile computing devices 204.1 and 204.2, two vehicles 202.1 and 202.2, one external computing device 206, and/or one infrastructure component 208, various aspects include alert notification system 200 implementing any suitable number of networks 201, mobile computing devices 204, vehicles 202, external computing devices 206, and/or infrastructure components 208. For example, alert notification system 200 may include a plurality of external computing devices 206 and more than two mobile computing devices 204, any suitable number of which being interconnected directly to one another and/or via network 201.

In one aspect, each of mobile computing devices 204.1 and 204.2 may be configured to communicate with one another directly via peer-to-peer (P2P) wireless communication and/or data transfer. In other aspects, each of mobile computing devices 204.1 and 204.2 may be configured to communicate indirectly with one another and/or any suitable device via communications over network 201, such as external computing device 206 and/or infrastructure component 208, for example. In still other aspects, each of mobile computing devices 204.1 and 204.2 may be configured to communicate directly and indirectly with one and/or any suitable device, which may be concurrent communications or communications occurring at separate times.

Each of mobile computing devices 204.1 and 204.2 may be configured to send data to and/or receive data from one another and/or via network 201 using one or more suitable communication protocols, which may be the same communication protocols or different communication protocols as one another. To provide an example, mobile computing devices 204.1 and 204.2 may be configured to communicate with one another via a direct radio link 203a, which may utilize, for example, a Wi-Fi direct protocol, an ad-hoc cellular communication protocol, etc. Furthermore, mobile computing devices 204.1 and 204.2 may be configured to communicate with the vehicle on-board computers located in vehicles 202.1 and 202.1, respectively, utilizing a BLUETOOTH communication protocol (radio link not shown).

To provide additional examples, mobile computing devices 204.1 and 204.2 may be configured to communicate with one another via radio links 203b and 203c by each communicating with network 201 utilizing a cellular communication protocol. As an additional example, mobile computing devices 204.1 and/or 204.2 may be configured to communicate with external computing device 206 via radio links 203b, 203c, and/or 203e. Still further, one or more of mobile computing devices 204.1 and/or 204.2 may also be configured to communicate with one or more smart infrastructure components 208 directly (e.g., via radio link 203d) and/or indirectly (e.g., via radio links 203c and 203f via network 201) using any suitable communication protocols.

Mobile computing devices 204.1 and 204.2 may be configured to execute one or more algorithms, programs, applications, etc., to determine a geographic location of each respective mobile computing device (and thus their associated vehicle) to generate, measure, monitor, and/or collect one or more sensor metrics as telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications.

Network 201 may be implemented as any suitable network configured to facilitate communications between mobile computing devices 204.1 and/or 204.2 and one or more of external computing device 206 and/or smart infrastructure component 208. For example, network 201 may include one or more telecommunication networks, nodes, and/or links used to facilitate data exchanges between one or more devices, and may facilitate a connection to the Internet for devices configured to communicate with network 201. Network 201 may include any suitable number of interconnected network components that form an aggregate network system, such as dedicated access lines, plain ordinary telephone lines, satellite links, cellular base stations, a public switched telephone network (PSTN), etc., or any suitable combination thereof. Network 201 may include, for example, a proprietary network, a secure public internet, a mobile-based network, a virtual private network, etc.

In aspects in which network 201 facilitates a connection to the Internet, data communications may take place over the network 201 via one or more suitable Internet communication protocols. For example, network 201 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 203a-203f may represent wired links, wireless links, or any suitable combination thereof.

In aspects in which mobile computing devices 204.1 and 204.2 communicate directly with one another in a peer-to-peer fashion, network 201 may be bypassed and thus communications between mobile computing devices 204.1 and 204.2 and external computing device 206 may be unnecessary. For example, in some aspects, mobile computing device 204.1 may broadcast geographic location data and/or telematics data directly to mobile computing device 204.2. In this case, mobile computing device 204.2 may operate independently of network 201 to determine whether an alert should be generated at mobile computing device 204.2 based upon the geographic location data and the telematics data. In accordance with such aspects, network 201 and external computing device 206 may be omitted.

However, in other aspects, one or more of mobile computing devices 204.1 and/or 204.2 may work in conjunction with external computing device 206 to generate alerts. For example, in some aspects, mobile computing device 204.1 may broadcast geographic location data and/or telematics data, which is received by external computing device 206. In this case, external computing device 206 may be configured to determine whether an alert should be sent to mobile computing device 204.2 based upon the geographic location data and the telematics data.

External computing device 206 may be configured to execute various software applications, algorithms, and/or other suitable programs. External computing device 206 may be implemented as any suitable type of device to facilitate the functionality as described herein. For example, external computing device 206 may be implemented as a network server, a web-server, a database server, one or more databases and/or storage devices, or any suitable combination thereof. Although illustrated as a single device in FIG. 2, one or more portions of external computing device 206 may be implemented as one or more storage devices that are physically co-located with external computing device 206, or as one or more storage devices utilizing different storage locations as a shared database structure (e.g. cloud storage).

In some embodiments, external computing device 206 may be configured to perform any suitable portion of the processing functions remotely that have been outsourced by one or more of mobile computing devices 204.1 and/or 204.2. For example, mobile computing device 204.1 and/or 204.2 may collect data (e.g., geographic location data and/or telematics data) as described herein, but may send the data to external computing device 206 for remote processing instead of processing the data locally. In such embodiments, external computing device 206 may receive and process the data to determine whether an anomalous condition exists and, if so, whether to send an alert notification to one or more mobile computing devices 204.1 and 204.2.

In one aspect, external computing device 206 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. For example, external computing device 206 may facilitate the receipt of telematics data or other data from one or more mobile computing devices 204.1-204.N, which may be associated with insurance customers and/or running a Telematics App, as further discussed below with reference to FIG. 3.

In aspects in which external computing device 206 facilitates communications with an insurer computing system (or is part of such a system), data received from one or more mobile computing devices 204.1-204.N may include logon credentials which may be verified by external computing device 206 or one or more other external computing devices, servers, etc. These logon credentials may be associated with an insurer profile, which may include, for example, insurance policy numbers, a description and/or listing of insured assets, vehicle identification numbers of insured vehicles, addresses of insured structures, contact information, premium rates, discounts, etc.

In this way, data received from one or more mobile computing devices 204.1-204.N may allow external computing device 206 to uniquely identify each insured customer and/or whether each identified insurance customer has installed the Telematics App. Furthermore, any data collected from one or more mobile computing devices 204.1-204.N may be referenced to each insurance customer and/or any insurance policies associated with each insurance customer for various insurance-related purposes.

For example, as further discussed below with reference to FIG. 3, the one or more mobile computing devices 204.1-204.N may broadcast, in addition to or as part of the telematics data, data indicative of whether a Telematics App has been installed and/or usage data indicative of how often a driver uses the Telematics App functionality while driving. Of course, similar or identical data may be received from a vehicle as opposed to the mobile computing device located in the vehicle. That is, the same functions discussed below with reference to FIG. 3 regarding the Telematics App installed and executed on a mobile computing device may also (or alternatively) be installed and executed as part of a vehicle's integrated computer functions, as previously discussed with reference to FIG. 1 above.

In various aspects, an insurer may leverage data regarding whether an insured customer has installed a Telematics App or how often the Telematics App is used while driving to calculate, adjust, and/or update various insurance pricing for an automotive insurance policy or other suitable insurance policy. For example, an insurer may adjust insurance premiums, rates, discounts, points, programs, etc., based upon the insured having the functionality discussed herein and/or the amount that the insured uses the functionality discussed herein.

In addition, external computing device 206 may facilitate the communication of the updated insurance policies, premiums, rates, discounts, etc., to insurance customers for their review, modification, and/or approval—such as via wireless communication or data transmission to one or more mobile computing devices 204.1-204.N. For example, an insurer may provide an initial discount for an insured customer installing the Telematics App and logging in with the Telematics App. To continue this example, because the alert notifications provided by the Telematics App may reduce the likelihood of a collision or other damage occurring to the vehicle or the driver, use of the Telematics App may function to mitigate or prevent driving risks upon which an insurance policy is partially based. Therefore, an insurer may provide an additional discount that increases with the insured customer's usage of the Telematics App while driving.

With respect to FIG. 2, infrastructure component 208 may be implemented as any suitable type of traffic infrastructure component configured to receive communications from and/or to send communications to other devices, such as external computing devices 204.1, 204.2 and/or external computing device 206, for example. In some aspects, as noted herein, infrastructure component 208 may be implemented as one or more "smart" infrastructure components, which may be configured to communicate with one or more other devices directly and/or indirectly.

For example, smart infrastructure component 208 may be configured to communicate with one or more devices directly and/or indirectly. For example, smart infrastructure component 208 may be configured to communicate directly with mobile computing device 204.2 via link 203.*d* and/or with mobile computing device 204.1 via links 203*b* and 203*f* utilizing network 201. To provide another example, smart infrastructure component 208 may communicate with external computing device 206 via links 203*e* and 203*f* utilizing network 201.

Smart infrastructure component 208 may be implemented as any suitable type of traffic infrastructure component configured to receive communications from and/or to send communications to other devices, such as external computing devices 204.1, 204.2 and/or external computing device 206, for example. For example, smart infrastructure component 208 may be implemented as a traffic light, a railroad crossing light, a construction notification sign, a roadside display configured to display messages, a billboard display, etc.

In some aspects, smart infrastructure component 208 may be configured to receive geographic location data and/or telematics data from one or more other devices and to process this data to determine whether an anomalous condition has been detected and whether the detected anomalous condition satisfies a threshold distance condition with respect to smart infrastructure component 208. The threshold distance condition may include, for example, the geographic location of the anomalous condition being within a threshold radius of smart infrastructure component 208, on the same road serviced by smart infrastructure component 208, etc. If so, smart infrastructure component 208 may perform one or more relevant actions such as displaying one or more relevant messages to notify drivers in the vicinity, to modify traffic patterns, to change traffic light timing, to redirect traffic, etc.

In other aspects, smart infrastructure component 208 may receive data indicating that an alert is to be generated and/or the type of alert that is to be generated. In accordance with such aspects, one or more of mobile computing devices 204.1, 204.2 and/or external computing device 206 may make the determination of whether an anomalous condition exists and is within a threshold distance of smart infrastructure component 208. If so, the data received by smart infrastructure component 208 may be indicative of the type of anomalous condition, the location of the anomalous condition, commands to cause smart infrastructure component 208 to perform one or more acts, the type of acts to perform, etc.

To provide some illustrative examples, if smart infrastructure component 208 is implemented as a smart traffic light, smart infrastructure component 208 may change a traffic light from green to red (or vice-versa) or adjust a timing cycle to favor traffic in one direction over another. To provide another example, if smart infrastructure component 208 is implemented as a traffic sign display, smart infrastructure component 208 may display a warning message that the anomalous condition (e.g., a traffic accident) has been detected ahead and/or on a specific road corresponding to the geographic location data.

In additional aspects, other vehicles may play a role in the one or more alert notifications. To provide an illustrative example, an emergency vehicle (e.g., an ambulance, fire truck, etc.) may be dispatched to the scene of an accident. In such a case, the emergency vehicle may be configured to broadcast one or more signals that cause one or more of mobile computing devices 204.1-204.2 to generate one or more alert notifications and/or smart infrastructure component 208 to change to a different state. These signals may be broadcasted from a mobile computing device carried by emergency response personnel and triggered upon the vehicle approaching (e.g., within a threshold distance) a geographic location associated the vehicle accident. Additionally or alternatively, the signals may be broadcasted by any suitable device mounted in or otherwise associated with the emergency response vehicle.

To provide another illustrative example, a train may broadcast one or more signals indicating that the train is approaching a railroad crossing, which is received by one or more of mobile computing devices 204.1-204.2 and/or smart infrastructure component 208 and results in the mobile computing devices generating one or more alert notifications and/or the smart infrastructure component 208 changing to a different state. Similar to the emergency vehicle example above, the broadcasted signal may be transmitted upon the train approaching (e.g., within a threshold distance) of the crossing location, and may be transmitted from a mobile computing device and/or equipment mounted on or otherwise associated with the train.

Additional vehicles such as emergency response vehicles and trains are not illustrated in FIG. 2 for purposes of brevity. However, the signals transmitted from these vehicles may be transmitted in accordance with any suitable communication protocol directly and/or indirectly to one or more or mobile computing devices 204.1-204.2 and/or smart infrastructure component 208. For example, the signals may be transmitted to directly to smart infrastructure component 208, indirectly to one more mobile computing devices 204.1-204.2 via network 201 and/or remote computing device 206, etc.

Exemplary End-User/Destination Devices

The following details regarding the determination of an anomalous condition are explained in this section with reference to computing device 300, which may be a mobile computing device or "mobile device" (e.g., smart phone, laptop, tablet, phablet, smart watch, wearable electronics, etc.). In the present aspect, computing device 300 may be implemented as any suitable computing device, such as a mobile computing device (e.g., mobile computing device 100, as shown in FIG. 1). In another aspect, computing device 300 may be implemented as an on-board vehicle computer (e.g., on-board vehicle computer 114, as shown in FIG. 1). In still other aspects, computing device 300 may be implemented as a device external to a vehicle (e.g., remote computing device 206 or smart infrastructure component 208, as shown in FIG. 2).

Depending upon the implementation of computing device 300, the methods and processes utilized to determine the existence of anomalous conditions may be performed locally, remotely, or any suitable combination of local and remote processing techniques.

Figure 3:
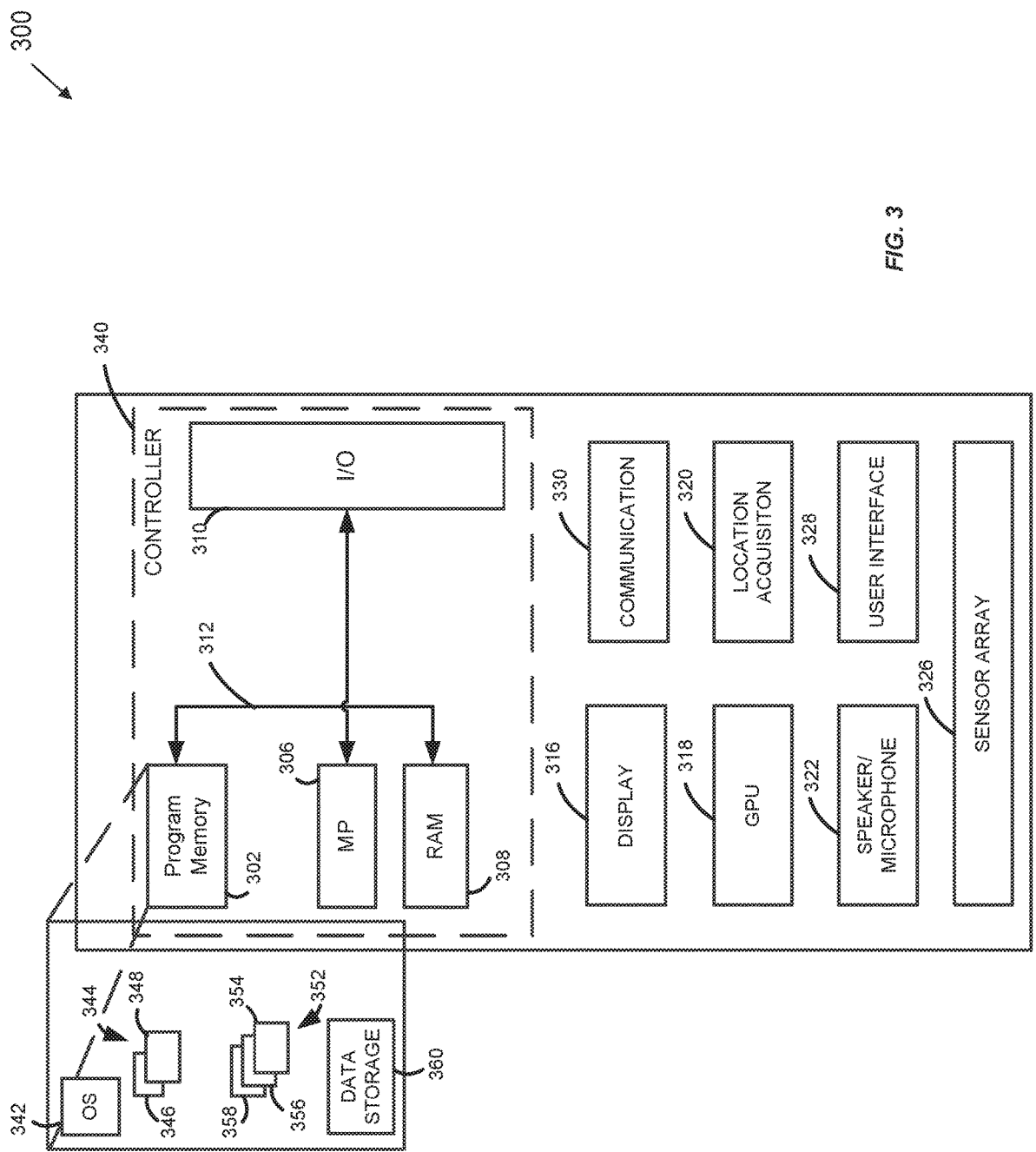
FIG. 3 illustrates a block diagram of an exemplary mobile computing device 300 in accordance with an exemplary aspect of the present disclosure.

FIG. 3 illustrates a block diagram of an exemplary computing device or mobile device 300 in accordance with an exemplary aspect of the present disclosure. Computing device 300 may be implemented as any suitable computing device configured to (1) monitor, measure, generate, and/or or collect telematics data; (2) broadcast the geographic location data and/or the telematics data to one or more external components, such as via wireless communication and/or data transmission; (3) receive geographic location data and/or telematics data broadcasted from another device, such as via wireless communication and/or data transmission; (4) determine whether an anomalous condition exists at the geographic location indicated by the geographic location data based upon the telematics data; (5) generate one or more alerts indicative of the anomalous condition; and/or (6) broadcast one or more alert notifications to other devices, such as via wireless communication and/or data transmission.

Computing device 300 may include a display 316, a graphics processing unit (GPU) 318, a location acquisition unit 320, a speaker/microphone 322, a sensor array 326, a user interface 328, a communication unit 330, and/or a controller 340.

In one aspect, controller 340 may include a program memory 302, a microprocessor (MP) 306, a random-access memory (RAM) 308, and/or an input/output (I/O) interface 310, each of which may be interconnected via an address/data bus 312. Controller 340 may be implemented as any suitable type and/or number of processors, such as a host processor for the relevant device in which computing device 300 is implemented, for example. In some aspects, controller 240 may be configured to communicate with additional data storage mechanisms that are not shown in FIG. 3 for purposes of brevity (e.g., one or more hard disk drives, optical storage drives, solid state storage devices, etc.) that reside within or are otherwise associated with mobile computing device 200.

Program memory 302 may store data used in conjunction with one or more functions performed by computing device 300 to facilitate the interaction between computing device 300 and one or more other devices. For example, if computing device 300 is implemented as a mobile computing device (e.g., mobile computing device 204.1, as shown in FIG. 2), then program memory 302 may store one or more programs, applications, algorithms, etc. that, when executed by controller 340, facilitate the interaction between mobile computing device 204.1 and (i) one or more networks (e.g., network 201), (ii) other mobile computing devices (e.g., mobile computing device 204.2), (iii) external computing devices (e.g., external computing device 206), (iv) vehicles (e.g., vehicle 108), (v) vehicle on-board computers (e.g., on-board computer 114), infrastructure components (e.g., smart infrastructure component 208), etc.

In various aspects, program memory 302 may be implemented as a non-transitory tangible computer readable media configured to store computer-readable instructions, that when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

In one aspect, one or more MPs (micro-processors) 306 may be configured to execute one or more of software applications 344, software routines 352 residing in program memory 302, and/or other suitable software applications. For example, operating system 342 may be implemented as any suitable operating system platform depending upon the particular implementation of computing device 300. For example, if computing device 300 is implemented as a mobile computing device, operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one embodiment, data storage 360 may store data such as application data for the one or more software applications 344, routine data for the one or more software routines 352, geographic location data and/or telematics data, etc.

Display 316 may be implemented as any suitable type of display and may facilitate user interaction with computing device 300 in conjunction with user interface 328. For example, display 316 may be implemented as a capacitive touch screen display, a resistive touch screen display, etc. In various embodiments, display 316 may be configured to work in conjunction with controller 340 and/or GPU 318 to display alerts and/or notifications received from other devices indicative of detected anomalous conditions.

Communication unit 330 may be configured to facilitate communications between computing device 300 and one or more other devices, such as other mobile computing devices, networks, external computing devices, smart infrastructure components, etc. As previously discussed with reference to FIGS. 1 and 2, computing device 300 may be configured to communicate with these other devices in accordance with any suitable number and type of communication protocols. Thus, in various aspects, communication unit 330 may be configured to support any suitable number and type of communication protocols based upon a particular network and/or device in which computing device 300 is communicating to facilitate this functionality.

Communication unit 330 may be configured to support separate or concurrent communications, which may be the same type of communication protocol or different types of communication protocols. For example, communication unit 330 may be configured to facilitate communications between computing device 300 and an external computing device (e.g., external computing device 206) via cellular communications while facilitating communications between computing device 300 and the vehicle in which it is carried (e.g., vehicle 108) via BLUETOOTH communications.

Communication unit 330 may be configured to broadcast data and/or to receive data in accordance with any suitable communications schedule. For example, communication unit 330 may be configured to broadcast geographic location data and/or telematics data every 15 seconds, every 30 seconds, every minute, etc. As will be further discussed below, the geographic location data and/or telematics data may be sampled in accordance with any suitable sampling period. Thus, when broadcasted by communications unit 330 in accordance with a recurring schedule, the geographic location data and/or telematics data may include a log or collection of the geographic location data and/or telematics data that was sampled since the last data transmission. A suitable communication schedule may be selected as a tradeoff between a desired anomalous condition detection speed and battery usage of computing device 300, when applicable.

Additionally or alternatively, aspects include communication unit 330 being configured to conditionally send data, which may be particularly advantageous when computing device 300 is implemented as a mobile computing device, as such conditions may help reduce power usage and prolong battery life. For example, communication unit 330 may be configured to only broadcast when telematics data has been sampled since the last transmission, which will be further discussed below with regards to sensor array 326. Controller 340 may determine whether has been sampled since the last transmission by, for example, analyzing a memory address range (e.g., in data storage 360, RAM 308, etc.) associated with the storage of the telematics data and comparing the contents of this buffer to a known range of valid values.

To provide another example, aspects include communication unit 330 being additionally or alternatively configured to only broadcast telematics data when computing device 300 is connected to a power source (e.g., an in-vehicle charger). To provide still another example, aspects include communication unit 330 being additionally or alternatively configured to only broadcast telematics data when communication unit 330 is connected to and/or communicating with a device identified as a vehicle. This may include, for example, identifying a BLUETOOTH connection as a valid vehicle to satisfy this condition upon installation and/or setup of the relevant application or program executed by computing device 300 to facilitate the functionality described herein.

Location acquisition unit 320 may be configured to generate geographic location data utilizing any suitable global positioning techniques. For example, location acquisition unit 320 may communicate with one or more satellites and/or wireless transmitters to determine a location of computing device 300. Location acquisition unit 320 may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of computing device 300.

In one aspect, location acquisition unit 320 may periodically store one or more geographic locations of computing device 300 as geographic location data in any suitable portion of memory utilized by computing device 300 (e.g., program memory 302, RAM 308, etc.) and/or to another device (e.g., another mobile computing device, an external computing device, etc.). In this way, location acquisition unit 320 may sample the location of computing device 300 in accordance with any suitable sampling rate (e.g., every 5 seconds, 10 seconds, 30 seconds, etc.) and store this geographic location data representing the position of computing device 300, and thus the vehicle in which it is travelling, over time.

Speaker/microphone 322 may be configured as one or more separate devices. Speaker/microphone 322 may include a microphone configured to detect sounds and to convert sounds to data suitable for communications via communications unit 330. Speaker/microphone 322 may additionally or alternatively include a speaker configured to play sound in response to data received from one or more components of computing device 300 (e.g., controller 340). In one embodiment, speaker/microphone 322 may be configured to play audible alerts.

User-interface 328 may be implemented as any suitable device configured to collect user input, such as a "soft" keyboard displayed on display 316 of computing device 300, a keyboard attached to computing device 300, an external keyboard communicating via a wired or a wireless connection (e.g., a BLUETOOTH keyboard), an external mouse, etc.

Sensor array 326 may be configured to measure any suitable number and/or type of sensor metrics as part of the telematics data. In one aspect, sensor array 326 may be implemented as one or more sensors positioned to determine the speed, force, heading, and/or direction associated with movements of computing device 300 and, thus, a vehicle in which computing device 300 is positioned. Additionally or alternatively, sensor array 326 may be configured to communicate with one or more portions of computing device 300 to measure, collect, and/or generate one or more sensor metrics from one or more non-sensor sources, which will be further discussed below.

To generate one or more sensor metrics, sensor array 326 may include, for example, one or more cameras, accelerometers, gyroscopes, magnetometers, barometers, thermometers, proximity sensors, light sensors, Hall Effect sensors, etc. In aspects in which sensor array 326 includes one or more accelerometers, sensor array 326 may be configured to measure and/or collect accelerometer metric values utilizing an X-axis, Y-axis, and Z-axis accelerometer. In accordance with such aspects, sensor array 326 may measure sensor metric values as a three-dimensional accelerometer vector that represents the movement of computing device 300 in three dimensional space by combining the outputs of the X-axis, Y-axis, and Z-axis accelerometers using any suitable techniques.

In one aspect, sensor array 326 may include one or more cameras or other image capture devices. In accordance with such aspects, the one or more cameras that are part of sensor array 326 may be mounted or otherwise positioned on mobile computing device 300 such that, when mobile computing device 300 is docked, cradled, or otherwise mounted within a vehicle, images may be captured from this vantage point. For example, when mobile computing device 300 is mounted within a vehicle, a camera implemented by sensor array 326 may function as a dashboard camera, capturing images and/or video data of various objects outside of the vehicle from this vantage point. Additionally or alternatively, mobile computing device 300 may capture audio data with the image and/or video data via speaker/microphone 322.

In various aspects, mobile computing device 300 may begin to capture data upon detecting that it has been placed in a cradle, and otherwise not capture data in such a manner. This detection may occur, for example, via one or more conditions being satisfied. For example, mobile computing device 300 may utilize one or more sensors (e.g., an accelerometer that is part of sensor array 326) to determine that mobile computing device 300 has changed orientation to horizontal (as is common when docked in a vehicle), that mobile computing device 300 is communicating via BLUETOOTH with the vehicle, that the vehicle is moving above a threshold speed, etc. Aspects include any suitable number of conditions, upon being satisfied, triggering mobile computing device 300 to start collecting telematics data, images, audio, video, etc., via sensor array 326.

In various aspects, sensor array 326 may be configured to sample the one or more sensor metrics in accordance with any suitable sampling rate and/or based upon one or more conditions being satisfied. For example, sensor array 326 may be configured to implement one or more accelerometers to sample sensor metrics indicative of a g-force associated with vehicle braking, acceleration, and cornering at a rate of 15 Hz, 30 Hz, 60 Hz, etc., which may be the same sampling rate as one another or different sampling rates. To provide another example, sensor array 326 may be configured to implement one or more gyroscopes to improve the accuracy of the measured one or more sensor metrics and to determine whether the phone is in use or stationary within a vehicle. To provide another example, sensor array 326 may implement a compass (magnetometer) to determine a direction or heading of a vehicle in which computing device 300 is located.

Again, sensor array 326 may additionally or alternatively communicate with other portions of computing device 300 to obtain one or more sensor metrics even though these sensor metrics may not be measured by one or more sensors that are part of sensor array 326. For example, sensor array 326 may communicate with one or more of location acquisition unit 320, communication unit 330, and/or controller 340 to obtain data such as timestamps synchronized to the sampling of one or more sensor metrics (which may be measured to within hundredths of a second or smaller resolutions), geographic location data (and correlated timestamps thereof), a velocity based upon changes in the geographic location data over time, a battery level of computing device 300, whether a battery of computing device 300 is charging, whether computing device 300 is being handled or otherwise in use, an operating status of computing device 300 (e.g., whether computing device 300 is unlocked and thus in use).

In various aspects, sensor array 326 may base timestamps upon any suitable clock source, such as one utilized by location acquisition unit 320 for GNSS functions. The timestamps may be, for example, recorded or logged as various data is sampled to be synchronized to the sampling of one or more sensor metrics (which may be measured to within hundredths of a second or smaller resolutions).

Additionally or alternatively, sensor array 326, location acquisition unit 320, and/or communication unit 330 may log or otherwise measure various metrics or other data that may be used by controller 340 to determine how often the functionality of the Telematics Application is being utilized when a vehicle is being driven. For example, sensor array 326 may log the time when telematics data is being collected, when the Telematics Application is running, and/or when the Telematics Application has been started. To provide additional examples, communication unit 330 may store data indicative of a BLUETOOTH connection status of mobile computing device 300. To provide yet another example, location acquisition unit 320 may store and/or log the changes in geographic location of mobile computing device 300 over time.

In various aspects, controller 340 may determine how often a driver uses the Telematics App based upon any suitable combination of the aforementioned data. For example, the BLUETOOTH connection status may be leveraged to determine whether mobile computing device 300 is located in a vehicle. To provide another example, the changes in the geographic location data over time may be utilized to determine whether mobile computing device 300 has exceeded a threshold speed for a threshold duration of time. In this way, a determination may be made whether mobile computing device 300 is located in a vehicle while the vehicle is being driven.

Various aspects include the aforementioned data being leveraged to calculate a usage amount in which a user utilizes the Telematics App while driving. For example, the usage amount may be based upon a total proportion of time (e.g., 80% of the time while driving, the functionality provided by the Telematics App is enabled). To provide another example, the usage amount may be mileage-based (e.g., 90% of the miles driven are done so with the functionality of the Telematics App available to the driver). As discussed above, this usage data may be sent to an insurer or other third party via a telematics data transmission or a separate transmission and used to set and/or adjust an insurance policy, premium, or discount for the insured customer.

In one aspect, sensor array 326 may sample one or more sensor metrics based upon one or more conditions being satisfied. For example, sensor array 326 may determine, based upon gyroscope sensor metrics, communication with controller 340, etc., whether computing device 300 is in use. If computing device 300 is in use (e.g., when implemented as a mobile computing device) then the movement of computing device 300 within the vehicle may not truly represent the vehicle motion, thereby causing sensor metrics sampled during this time to be erroneous. Therefore, aspects include sensor array 326 sampling the one or more sensor metrics when computing device 300 is not in use, and otherwise not sampling the one or more sensor metrics.

In one aspect, sensory array 326 may include one or more cameras and/or image capture devices. When sensory array 326 is implemented with one or more cameras, these cameras may be configured as any suitable type of camera configured to capture and/or store images and/or video. For example, when mobile computing device 300 is mounted in a vehicle, the camera may be configured to store images and/or video data of the road in front of the vehicle in which it is mounted, and to store this data to any suitable portion of program memory 302 (e.g., data storage 360). Controller 340 and/or MP 306 may analyze this data to generate one or more local alerts, to transmit signals indicative of detected alters to one or more other devices, etc., which is further discussed below with reference to the execution of anomalous condition detection routine 358.

Again, the telematics data broadcasted by computing device 300 may include one or more sensor metrics. However, the telematics data may additionally or alternatively include other external data that may be relevant in determining the presence of an anomalous condition. For example, the telematics data may include external data such as speed limit data correlated to a road upon which computing device 300 is located (and thus the vehicle in which it is travelling), an indication of a type of road, a population density corresponding to the geographic location data, etc.

In some aspects, computing device 300 may obtain this external data by referencing the geographic location data to locally stored data (e.g., data stored in data storage 360) and broadcasting this data appended to or otherwise included with the sensor metrics data as part of the telematics data. In other aspects, the device receiving the telematics data (e.g., a mobile computing device, an external computing device, an infrastructure component) may generate the external data locally or via communications with yet another device. As will be further discussed below, this external data may further assist the determination of whether an anomalous condition is present.

In some aspects, software applications 344 and/or software routines 352 may reside in program memory 302 as default applications that may be bundled together with the OS of computing device 300. For example, web browser 348 may be part of software applications 344 that are included with OS 342 implemented by computing device 300.

In other aspects, software applications 344 and/or software routines 352 may be installed on computing device 300 as one or more downloads, such as an executable package installation file downloaded from a suitable application store via a connection to the Internet. For example, alert notification application 346, telematics collection routine 354, geographic location determination routine 356, and/or anomalous condition detection routine 358 may be stored to suitable portions of program memory 302 upon installation of a package file downloaded in such a manner. Examples of package download files may include downloads via the iTunes store, the Google Play Store, the Windows Phone Store, downloading a package installation file from another computing device, etc. Once downloaded, alert notification application 346 may be installed on computing device 300 as part of an installation package such that, upon installation of alert notification application 346, telematics collection routine 354, geographic location determination routine 356, and/or anomalous condition detection routine 358 may also be installed.

In one embodiment, software applications 344 may include an alert notification application 346, which may be implemented as a series of machine-readable instructions for performing the various tasks associated with executing one or more embodiments described herein. In one aspect, alert notification application 346 may cooperate with one or more other hardware or software portions of computing device 300 to facilitate these functions.

In one aspect, alert notification application 346 may function as a Telematics Application (or "App") which is downloaded and installed on mobile computing device (or mobile device) 300 by a user via a suitable third-party software store and/or portal (e.g., Apple iTunes, Google Play, the Windows Store, etc.).

To provide an illustrative example, alert notification application 344 may include instructions for performing tasks such as determining a geographic location of computing device 300 (e.g., via communications with location acquisition unit 330), monitoring, measuring, generating, and/or collecting telematics data, broadcasting the geographic location data and/or the telematics data to one or more external devices, receiving geographic location data and/or telematics data from another computing device, determining whether an anomalous condition exists based upon the geographic location data and/or the telematics data, generating one or more alerts indicative of the determined anomalous condition, receiving user input, facilitating communications between computing device 300 and one or more other devices in conjunction with communication unit 330, etc.

To provide another example, aspects include mobile computing device 300 being configured to capture image and/or video data while cradled in a dock or otherwise mounted within a vehicle, as previously discussed. In accordance with various aspects, this data capture may be facilitated, for example, by instructions stored in alert notification application 346 being executed by controller 340 and/or MP 306. In various aspects, alert notification application 346 may facilitate mobile computing device 300 capturing image, audio, and/or video data at any suitable sampling rate (e.g., once every second, 5 times per second, etc.) and storing this data to any suitable portion of the mobile computing device (e.g., data storage 360). Aspects include data sampling processes occurring as background operations to allow other applications to be run on mobile computing device 300 (e.g., navigation applications) while telematics data and/or images, video, and/or audio data is collected by mobile computing device 300.

Software applications 344 may include a web browser 348. In some embodiments (e.g., when computing device 300 is implemented as a mobile computing device), web browser 348 may be a native we browser application, such as Apple's Safari®, Google Android™ mobile web browser, Microsoft Internet Explorer® for Mobile, Opera Mobile™ etc. In other embodiments, web browser 348 may be implemented as an embedded web browser.

Regardless of the implementation of web browser 348, various aspects include web browser 348 being implemented as a series of machine-readable instructions for interpreting and displaying web page information received from an external computing device (e.g., external computing device 204.2, as shown in FIG. 2). This web page information may be utilized in conjunction with alert notification application 346 to perform one or more function of the aspects as described herein.

In one embodiment, software routines 352 may include a telematics collection routine 354. Telematics collection routine 354 may include instructions, that when executed by controller 340, facilitate sampling, monitoring, measuring, collecting, quantifying, storing, encrypting, transmitting, and/or broadcasting of telematics data. In some aspects, telematics collection routine 354 may facilitate collection of telematics data locally via one or more components of computing device 300 (e.g., via sensor array 326, location acquisition unit 320, controller 340, etc.). In other aspects, telematics collection routine 354 may facilitate the storage of telematics data received from another device (e.g., via communication unit 330).

In one embodiment, software routines 352 may include a geographic location determination routine 356. Geographic location determination routine 356 may include instructions, that when executed by controller 340, facilitate sampling, measuring, collecting, quantifying, storing, transmitting, and/or broadcasting of geographic location data (e.g., latitude and longitude coordinates). In some aspects, geographic location determination routine 356 may facilitate generating and/or storing geographic location data locally via one or more components of computing device 300 (e.g., via location acquisition unit 320 and/or communication unit 330). In other aspects, geographic location determination routine 356 may facilitate the storage of geographic location data received from another device (e.g., via communication unit 330).

Additionally or alternatively, software routines 352 may include anomalous condition detection routine 358. Anomalous condition detection routine 358 may include instructions, that when executed by controller 340, facilitate the determination of whether an anomalous condition exists based upon the telematics data, the geographic location data, and/or image and/or video data captured by one or more cameras or other imaging devices. An anomalous condition may include any suitable condition that indicates a deviation from normal traffic patterns. For example, if an accident occurs, traffic may slow down due to a car pileup, a reduction in available lanes, and/or rerouting of traffic. Because the telematics data may include data indicative of the speed limit at the location corresponding to the geographic location where the telematics data was sampled, a comparison between the speed of computing device 300 and the posted or other speed limit data (such as a comparison between mobile device or vehicle speed with a map of, and/or known, posted speed limit information) may indicate an anomalous condition. Furthermore, because each vehicle may sample and/or broadcast geographic location data and/or telematics data in real time, the anomalous conditions may be detected with minimal delay as they occur.

Although the speed of the vehicle may indicate an anomalous condition, aspects include other types of anomalous conditions being detected based upon the telematics data. For example, an anomalous condition may be identified when the one or more sensor metrics indicate that an airbag has been deployed, and thus the vehicle associated with computing device 300 has been in an accident. This may be determined, for example, via an analysis of barometer readings matching a pressure versus time profile and/or via an indication from a dedicated airbag deployment sensor located in the vehicle.

To provide another example, an anomalous condition may be identified based upon weather fluctuations associated with a rapid formation of ice, a sudden change from a paved to a dirt road, the triggering of a crash detection system, a threshold number of wheel slips and/or skids being sampled within a threshold sampling period (indicating slippery conditions), sensor metrics indicative of a rollover condition, a sudden stop (indicating a collision), a departure from the road (indicating a pulled over vehicle), etc.

To provide an illustrative example based upon a traffic accident, if a first vehicle carrying a first computing device 300 is slowed down due to a traffic accident, then the one or more sensor metrics sampled by sensor array 326 will indicate the speed of the first vehicle over a period of time. If the one or more sensor metrics indicate that the first vehicle's speed is below the speed limit by some threshold amount or proportion thereof (e.g., 20 mph in a 55 mph zone, 50% of the posted speed limit, etc.) and this is maintained for a threshold duration of time (e.g., 30 seconds, one minute, two minutes, etc.) then controller 340 may, upon execution of anomalous condition detection routine 358, conclude that an anomalous condition has been detected. This anomalous condition may also be correlated to the geographic location associated with the geographic location data due to synchronization between the geographic location data and the sampled telematics data.

Further continuing this example, upon determination of the anomalous condition, alert notification application 346 may broadcast a notification indicating the detected anomalous condition, the telematics data, and/or the geographic location data associated with the detected anomalous condition. In one aspect, a second vehicle equipped with a second computing device 300 may receive this data and further determine whether the anomalous condition is relevant based upon the geographic relationship between the first and second devices, which is further discussed below. If the anomalous condition is relevant, then the second computing device 300 may generate an alert indicating the anomalous condition.

To provide another example by modifying the details of the previous one, aspects may include computing device 300 broadcasting telematics data and/or geographic location data but not notification data. In accordance with such aspects, upon being received by a second computing device 300 (e.g., a mobile computing device in a second vehicle, an external computing device, a smart infrastructure component, etc.) the second computing device 300 may determine the relevance of the anomalous condition based upon the geographic relationship between itself and the first computing device 300.

If the second computing device 300 determines that an anomalous condition, even if present, would be irrelevant or inapplicable based upon the distance between these devices, the second computing device 300 may ignore the telematics data, thereby saving processing power and battery life. However, if the second computing device 300 determines that the geographic location data indicates a potentially relevant anomalous condition, the second computing device 300 may further process the telematics data and take the appropriate relevant action if an anomalous condition is found (e.g., issue an alert notification, generate an alert, display a warning message, etc.).

To provide yet another example by further modifying the details in the previous two, aspects may include computing device 300 broadcasting the telematics data and geographic location data to an external computing device (e.g., to external computing device 206 via network 201, as shown in FIG. 2). In addition, the second computing device 300 associated with the second vehicle may likewise broadcast telematics data and geographic location data to the external computing device. In accordance with such aspects, the external computing device may determine whether an anomalous condition exists and is relevant to each of the first and second devices 300 based upon a geographic relationship between the first and second devices 300. When relevant, external computing device may be configured to send alert notifications to the first and/or second devices 300, which may include any suitable type of communications such as push notifications, a short messaging service (SMS) message, an email, a notification that used in conjunction with the OS running on each receptive computing device 300, etc. Upon receiving the notification from the external computing device, the first and/or second computing device 300 may generate an alert indicating a description of the anomalous condition and/or its location.

The geographic relationship between two or more devices 300 may be utilized in several ways to determine the relevance of the anomalous condition. For instance, current speed, location, route, destination, and/or direction of travel of a first vehicle (collecting and/or associated with the telematics data) may be individually or collectively compared with current speed, location, route, destination, and/or direction of travel of a second vehicle traveling on the road. As one example of the geographic relationship, a first vehicle location (and associated with a travel or traffic event) may be compared with a second vehicle location, current route, and/or destination to determine whether the second vehicle should divert course or slow down to alleviate the risk of the second vehicle being involved in a collision or a traffic jam (as a result of the travel or traffic event that is identified by the telematics data).

As another example of the geographic relationship, a radius from one vehicle or a line-of-sight distance between vehicles may be utilized and compared to a threshold distance. For example, if computing device 300 is implemented as an external computing device and determines a line-of-sight distance between a first and second vehicle to be less than a threshold distance (e.g., a half mile, one mile, etc.), then the external computing device may issue an alert notification to both vehicles. In this way, an external computing device may act as an alert management device, processing data and sending notifications to those devices for which a detected anomalous condition is relevant.

In another example of the geographic relationship, the geographic location data may be correlated with a map database to associate the anomalous condition with a road and to determine the relevance of the anomalous condition based upon other vehicles sharing the road. The map database may be stored, for example, in a suitable portion of computing device 300 (e.g., data storage 360) or retrieved via communications with one or more external computing devices. To provide an illustrative example, a computing device 300 may be implemented as an external computing device. The external computing device may determine, from telematics data and geographic location data received from a first computing device 300, that a first vehicle is located on a highway at a certain geographic location. If the external computing device determines that a second computing device 300 in a vehicle travelling on the same highway is within a threshold distance approaching the first vehicle, then the external computing device may issue an alert notification to the second vehicle.

In yet other aspects, the geographic location data may be correlated with a geofence database to determine the relevance of the anomalous condition based upon whether other vehicles are located inside the geofence. The geofence database may be stored, for example, in a suitable portion of computing device 300 (e.g., data storage 360) or retrieved via communications with one or more external computing devices. To provide another illustrative example, a computing device 300 may be implemented as an external computing device. The external computing device may determine, from telematics data and geographic location data received from a first computing device 300, that a first vehicle is located on a highway at a certain geographic location. The external computing device may calculate a geofence having a shape substantially matching the road upon which the first vehicle is travelling.

The geofence may be calculated as having any suitable shape such that the appropriate vehicles are notified of the detected anomalous condition. For example, the geofence shape may follow the contours of the road and extend ahead of the first vehicle and behind the first vehicle some threshold distances, which may be the same or different than one another. To provide another example, the geofence shape may include other arterial roads that feed into the road upon which the first vehicle is travelling, roads anticipated to be impacted by the anomalous condition, etc.

In some aspects, the geofence may be adjusted or modified based upon a change in the location of computing device 300. This change may be triggered using any suitable data indicative of potentially increasing road densities, such as changes in population density data associated with the geographic location of the computing device 300, changes in a type of road upon which computing device 300 is determined to be travelling, etc.

For example, a first computing device 300 may be implemented as a mobile computing device and associated with a first vehicle, while a second computing device 300 may be implemented as an external computing device. The external computing device may calculate an initial geofence as a threshold distance radius centered about the first vehicle's location. The geographic location data corresponding to the first vehicle's location may have associated population density data that is correlated with locally stored data or data retrieved by the external computing device. When the population density data surpasses a threshold density value, the shape of the geofence may be adjusted from the radius centered about the first vehicle's location to include only the road upon which the first vehicle is travelling. In this way, computing device 300 may prevent false alert notifications from being sent to other vehicles travelling in close proximity to the first vehicle, but on nearby roads unaffected by the detected anomalous condition.

To provide another illustrative example, as previously discussed, one or more cameras integrated as part of sensor array 326 may store image and/or video data from a vantage point within a vehicle in which mobile computing device 300 is mounted to act as a dashboard camera. In accordance with such aspects, anomalous condition detection routine 358 may include instructions, that when executed by controller 340, facilitate the analysis of the image and/or video data to detect one or more anomalous conditions that may pose an immediate threat to the driver. These anomalous objects may also be identified as a traffic event, as previously discussed. This analysis may be performed in accordance with any suitable object recognition and/or image analysis to detect images in the path of the vehicle, such as animals, pedestrians, other vehicles, potholes, etc.

Upon detecting an anomalous object, mobile computing device 300 may issue the appropriate alert via display 316 and/or sound an alarm via speaker/microphone 322. Additionally or alternatively, mobile computing device 300 may, upon detecting an anomaly, broadcast one or more signals via communication unit 330, which are received directly or indirectly by other mobile computing devices. Again, these other mobile computing devices may then generate alert notifications locally when close to the geographic location of mobile computing device 300 where the signal was broadcasted. Aspects in which the detected anomalous condition is shared in this manner may be particularly useful when the identified anomaly is likely to threaten other drivers using the same road, such as potholes or objects blocking the roadway, for example.

Although FIG. 3 depicts controller 340 as including one program memory 302, one MP 306, and one RAM 308, controller 340 may include any suitable number of program memory 302, MP 306, and RAM 308. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

Exemplary Screenshots of an Alert Notification Application

Figure 4A:
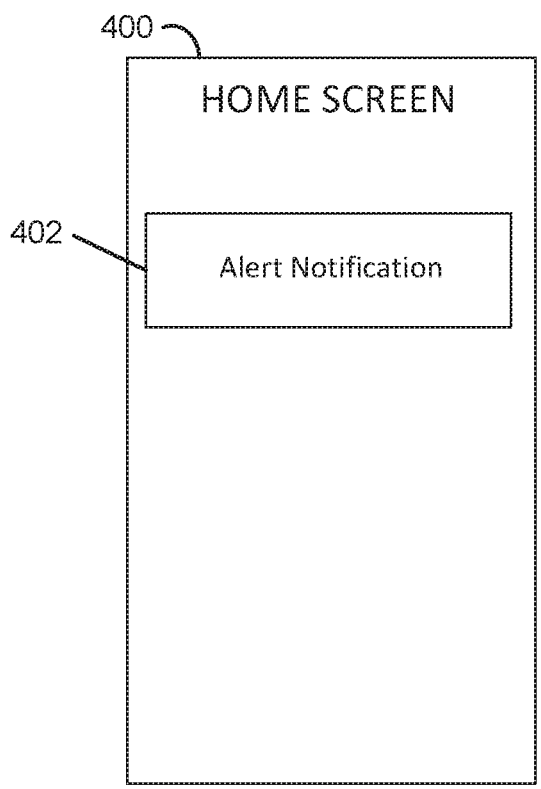
FIG. 4A illustrates an exemplary mobile computing device home screen 400 in accordance with an exemplary aspect of the present disclosure.

FIG. 4A illustrates an example mobile computing device home screen 400 in accordance with an exemplary aspect of the present disclosure. In various aspects, home screen 400 is displayed on a mobile computing device, such as mobile computing device 110 or mobile computing devices 204.1-204.2, as shown in FIGS. 1 and 2, respectively. In accordance with such aspects, home screen 400 may be displayed as part of a device display, such as display 316, for example, as shown in FIG. 3.

Home screen 400 may be displayed as a default screen on a mobile computing device. In one embodiment, home screen 400 may facilitate a lock screen of a mobile computing device. Lock screens may be typically displayed when a user locks the mobile computing device to enter a lock screen mode (e.g., by pressing a physical button). Additionally or alternatively, the mobile computing device may revert to the lock screen when inactive for a threshold period of time. The lock screen prevents a user from using a portion of the mobile computing device functionality. For example, a lock screen might prevent a mobile computing device in a user's pocket from accidentally sending SMS messages or phone calls.

Although lock screens typically limit the functionality of the device when enabled, it may be desirable for certain applications to provide a user with some functionality via the lock screen. For example, if the mobile computing device is used to play music, a lock screen overlay could allow a user to change tracks, pause a track, or adjust the volume level without unlocking the phone. In accordance with some aspects, alert notification 402 may be displayed as part of a home screen and/or lock screen of a mobile computing device, as shown in FIG. 4A.

Although alert notification 402 may be displayed as part of home screen 400, other aspects include alert notification 402 being displayed as part of a notification system separate from home screen 400. For example, some mobile phone operating systems (e.g., the Android OS) implement a universal "pull-down" notification system where all incoming notifications are displayed. In these notification systems, new notifications are initially previewed in a notification bar at the top of the phone display, and a user may pull down the notification bar (e.g., by using a swiping gesture) to access the details of any received notifications. In one aspect, alert notification 402 may be displayed as part of a notification bar type notification.

As previously discussed with reference to FIG. 3, a device running the alert notification application may be configured to determine whether an anomalous condition has been detected and/or to receive alert notifications sent by other devices that have done so. In accordance with such aspects, alert notification 402 is a block diagram representation of what may be generated upon detection of an anomalous condition and/or receiving an indication that an anomalous condition has been detected. Alert notification 402 may be implemented as any suitable graphic, label, text, description, etc., to convey this to a user. In one embodiment, alert notification 402 may be interactive and may facilitate a user selection via an appropriate gesture (e.g., swiping, tapping, etc.).

Figure 4B:
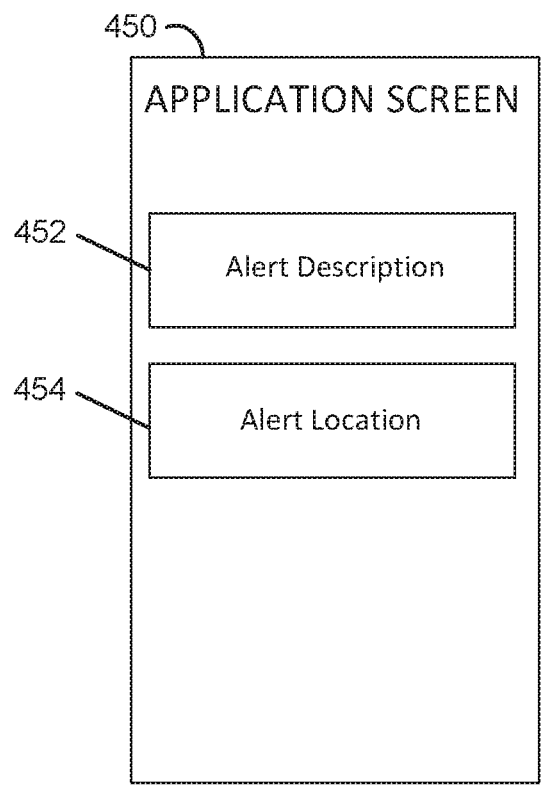
FIG. 4B illustrates an exemplary mobile computing device application screen 450 in accordance with an exemplary aspect of the present disclosure.

FIG. 4B illustrates an example mobile computing device application screen 450 in accordance with an exemplary aspect of the present disclosure. In various aspects, application screen 450 may be displayed on a mobile computing device, such as mobile computing device 110 or mobile computing devices 204.1-204.2, as shown in FIGS. 1 and 2, respectively. In accordance with such aspects, application screen 450 may be displayed as part of a device display, such as display 316, for example, as shown in FIG. 3.

In one aspect, application screen 450 may be displayed upon a user selecting alert notification 402 from home screen 400. Application screen 450 may include an alert description 452 and an alert location 454. Alert description 452 is a block diagram representation of one or more descriptions of the alerts related to the detected anomalous condition. Alert description 452 may be implemented as any suitable graphic, label, text, description, etc., to convey this to a user. For example, alert description 452 may include a text description such as "slow traffic ahead," "traffic at standstill ahead," "unpaved road ahead," "potential icy conditions ahead," "pulled over vehicle ahead," etc.

Alert location 454 is a block diagram representation of one or more descriptions of the location of the anomalous condition. Alert location 454 may be implemented as any suitable graphic, label, text, description, etc., to convey this to a user. For example, alert location 454 may include a directional compass indicating a direction towards the anomalous condition from the mobile computing device displaying application screen 450. To provide additional examples, alert location 454 may include a distance to the anomalous condition, a map overlaid with the location of the mobile computing device displaying application screen 450 to indicate the position of the mobile computing device in relation to the anomalous condition, the threshold distances and/or geofences used to determine the relevance of the anomalous condition, etc.

Exemplary Method of Generating Alert Notifications

Figure 5:
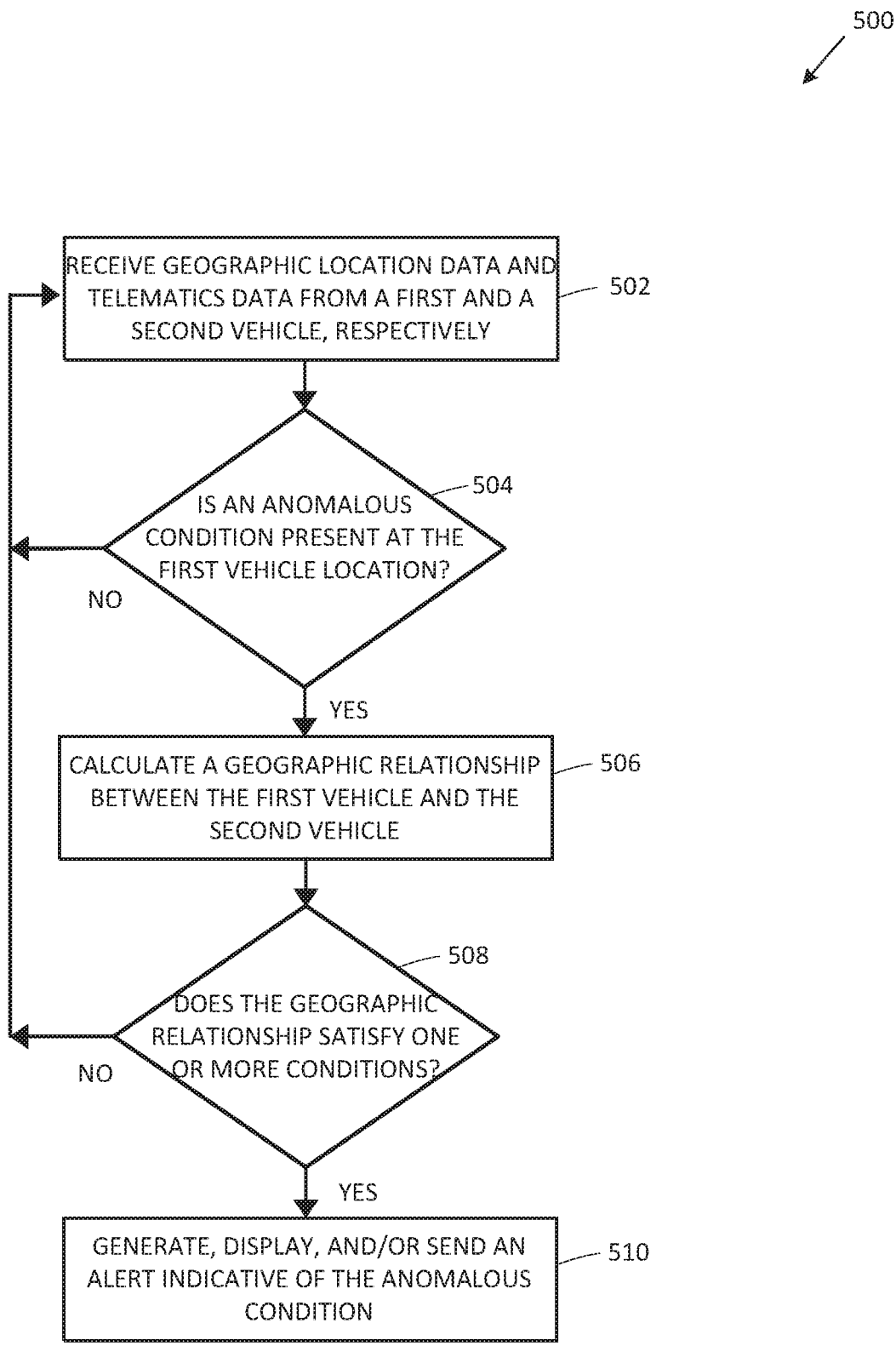
FIG. 5 illustrates an exemplary computer-implemented method 500 of generating, displaying, and/or sending an alert based upon telematics data in accordance with an exemplary aspect of the present disclosure.

FIG. 5 illustrates an exemplary method 500 of generating, displaying, and/or sending an alert based upon telematics data in accordance with an exemplary aspect of the present disclosure. In the present aspect, the method 500 may be implemented by any suitable computing device (e.g., mobile computing devices 204.1 and 204.2, external computing device 206, and smart infrastructure component 208, as shown in FIG. 2). In one aspect, the method 500 may be performed by one or more processors, applications, and/or routines, such as any suitable portion of controller 340, software applications 344, and/or software routines 352, for example, as shown in FIG. 3.

The method 500 may start when one or more processors receive geographic location data and/or telematics data from a first and a second respective vehicle (block 502). The geographic location data may include, for example, latitude and longitude coordinates obtained by a mobile computing device and/or an on-board computer located within each vehicle. The telematics data may include, for example, one or more sensor metrics indicative of a motion of each vehicle, timestamp data, road type data, population density data, and any other suitable data indicative of a status of the device from which it is received, as previously discussed with reference to FIG. 3 (block 502). The geographic location data and/or telematics data may be generated, for example, by one or more mobile computing devices and/or on-board computers located within, or otherwise associated with, the first and second vehicles.

The method 500 may include one or more processors determining whether an anomalous condition is present at the location of the first or the second vehicle based upon the telematics data received from each respective vehicle (block 504). The determination may be made, for example, when one or more sensor metrics, included in the telematics data, indicates that a vehicle is moving at a slower rate of speed, that an airbag has been deployed, that a crash has occurred, etc. (block 504). If the one or more processors determine that an anomalous condition is present, then method 500 may continue (block 506). Otherwise, the method 500 may revert to receiving geographic location data and/or telematics data (block 502).

The method 500 may include one or more processors calculating a geographic relationship between the first and the second vehicle (block 506). This geographic relationship may be a geofence around the first or the second vehicle, a radius around the first or the second vehicle representing a threshold distance, etc. (block 506).

The method 500 may include one or more processors determining whether the geographic relationship satisfies one or more conditions (block 508). These conditions may include, for example, one of the vehicles being within the radius, the threshold distance, and/or the geofence (block 508) that was calculated as a geographic relationship between the first and the second vehicles (block 506). Other conditions may include, for example, determining whether a location of traffic event (as determined from the telematics data associated with one vehicle) may be in the vicinity or pre-determined threshold distance of the current location, route, and/or destination another vehicle traveling on the road. Other geographical relationships may be determined, including those discussed elsewhere herein.

If the one or more conditions are satisfied, then the method 500 may continue (block 510). Otherwise, the method 500 reverts to receiving geographic location data and/or telematics data (block 502).

The method 500 may include one or more processors generating, displaying, and/or sending an alert indicative of the anomalous condition (block 510). In various aspects, the method 500 may include different acts that may be performed based upon the type of computing device. For example, if method 500 is performed by a mobile computing device, the method 500 may include generating and displaying the alert, as previously discussed with reference to FIGS. 4A and 4B (block 510). However, if the method 500 is performed by a smart infrastructure component, the method 500 may include displaying a message, as previously discussed with reference to FIG. 2 (block 510). To provide yet another example, if the method 500 is performed by an external computing device, then the method 500 may include one or more processors sending an alert notification to another device, as previously discussed with reference to FIG. 2 (block 510).

The method 500 may include additional, fewer, or alternate actions, including those discussed elsewhere herein. For instance, in addition to generating alerts, the method may include generating, sending, receiving, and/or displaying alternate routes to destinations that avoid the traffic event or anomalous condition.

Figure 6:
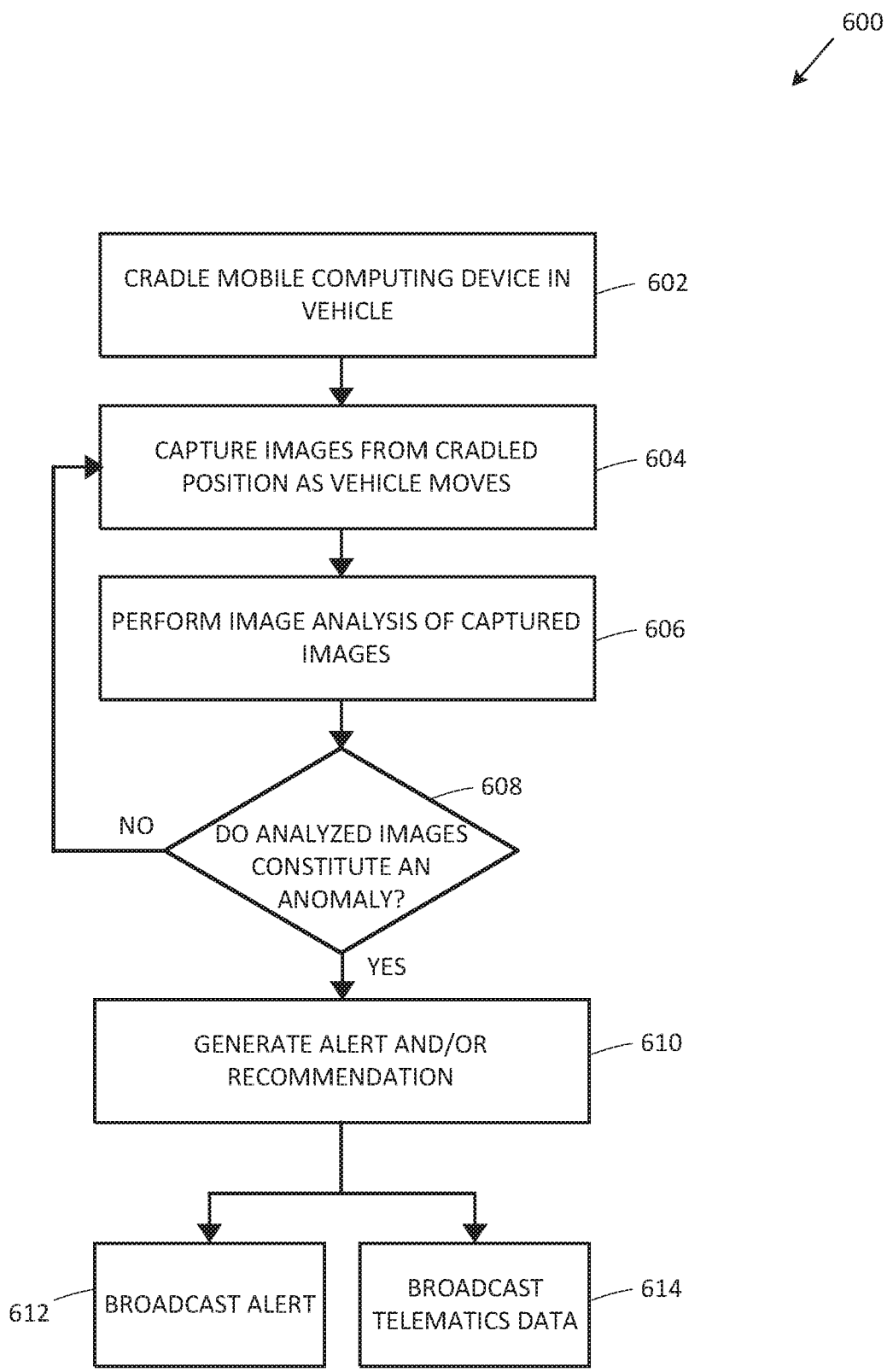
FIG. 6 illustrates a computer-implemented method 600 for broadcasting alerts and/or telematics data via a cradled mobile computing device to facilitate safer vehicle travel.

Exemplary Telematics Generation and Alert Issuance Via Cradled Mobile Computing Device FIG. 6 illustrates a computer-implemented method 600 for broadcasting alerts and/or telematics data via a cradled mobile computing device to facilitate safer vehicle travel. In the present aspect, method 600 may be implemented by any suitable computing device (e.g., mobile computing device 300, as shown in FIG. 1). The method may include additional, less, or alternate actions, including those discussed elsewhere herein, and/or may be implemented via one or more local or remote processors, or via computer-executable instructions stored on non-transitory computer-readable medium or media. For example, in the present aspect, method 600 may be performed by one or more processors, applications, and/or routines, such as controller 340 executing instructions in one or more modules stored in program memory 302, for example, as shown in FIG. 3.

The method 600 may include a user cradling a mobile computing device (e.g., mobile computing device 300) within a vehicle (block 602). For instance, a mobile computing device may be placed within a dashboard mounted cradle or other type of mount (block 602).

The method 600 may include one or more processors capturing image, audio, or other data via the mobile device as the vehicle moves (block 604). For example, the mobile computing device may be mounted in a manner so as to capture image, audio, and/or other data regarding various objects (e.g., vehicles, animals, pedestrians, etc.) located in front of, behind, outside of, or around the vehicle (block 604). Again, the capture of various image, audio, and/or video data may be facilitated, for example, by a Telematics App (e.g., alert notification application 346) which is stored on a mobile computing device memory unit and executed by a mobile computing device processor.

The method 600 may include one or more processors performing image analysis of captured images (block 606). The analyzed images may include, for example, single images captured based upon a particular sampling rate and/or one or more frames of video captured while the vehicle is moving (block 606). Again, the images may be analyzed in accordance with any suitable number and/or type of image recognition and/or object recognition techniques (block 606).

The method 600 may include one or more processors determining whether the analyzed images (block 606) constitute an anomaly (block 608). This may include, for example alert notification application 346 facilitating the analysis of the image data using any suitable image recognition and/or object recognition techniques to identify objects, determine their size and/or shape, and/or to determine the distance between identified objects and the vehicle in which the mobile computing device is located. Based upon an object's size, shape, and/or distance, a determination may be made whether each object, which has been identified via image analysis, poses a threat or constitutes an anomaly that warrants generating an alert (block 608). For example, if a detected object is within a pre-determined distance of the vehicle, is larger than a minimum threshold size, matches a specific profile shape corresponding to a known hazard, etc., then it may be determined that the analyzed image includes an anomaly (block 608).

To provide an illustrative example, if an object recognition analysis is performed on the images (block 606) and this results in the identification of a matched profile corresponding to the shape and size of a herd of deer (or a single deer), then such a hazard may be appropriately identified (block 608).

The method 600 may include one or more processors generating an alert and/or recommendation regarding the identified anomaly (block 610). In an aspect, the type of alert and/or recommendation generated may be based upon the type of anomaly that has been identified (block 608).

For example, if one or more deer are identified (block 608), aspects include the mobile computing device displaying an indication to the driver of the vehicle recommending that the driver slow down, change lanes, etc. (block 610). To provide another example, if the images are analyzed and match a profile of the shape and size of a pedestrian (e.g., in a cross walk), the mobile computing device may display an indication to the driver of the vehicle recommending to stop the vehicle (block 610). Aspects include audible or visual alerts being additionally or alternatively generated by the mobile computing device, such as "Deer Alert," "Pedestrian Alert," etc. (block 610).

In some aspects, the generated alert and/or recommendation (block 610) may be provided on the mobile computing device locally and not broadcasted or otherwise shared with other drivers (block 610). However, in other aspects, method 600 may include one or more processors broadcasting the alert and/or broadcasting the telematics data, which may include the images, audio, and/or video captured by the mobile computing device.

In accordance with aspects in which the mobile computing device broadcasts alerts and/or telematics data, the alert may, once identified, be broadcasted in accordance with any suitable communication protocol to any suitable number and/or type of devices (block 612). Similarly, any collected telematics data may be broadcasted in any suitable communication protocol to any suitable number and/or type of devices. Aspects include the alert (block 612) and the telematics data (block 614) being broadcasted simultaneously, separately, and/or as part of the same data transmission.

When both alerts and telematics data are broadcasted, aspects include these transmissions including a suitable identifier so that alerts may be correlated with the telematics data when received by another device. For example, upon detecting particular types of hazards that are likely to impact other drivers at the same location, the mobile computing device may generate and broadcast an alert indicating the type and severity of the anomaly as well as telematics data including the location of the anomaly to other nearby vehicles, to an external computing device (e.g., external computing device 206), and/or to one or more infrastructure components (e.g., smart infrastructure).

To provide an illustrative example with reference to FIG. 2, mobile computing device 204.1, which is located in vehicle 202.1, may actively capture images while vehicle 202.1 is being driven. As vehicle 202.1 approaches an area in which a recent rock slide has blocked part of the road, mobile computing device 204.1 may determine, based upon object recognition being performed on the captured images in front of vehicle 202.1, that a lane is partially blocked, and issue an audible and/or visual alert to the driver of vehicle 202.1 to avoid the hazard.

Continuing this example, aspects include mobile computing device 204.1 generating and transmitting an alert, which may include a description of what is impacted by the hazard (e.g., rightmost lane blocked) and the type of hazard (e.g., a rock slide), while broadcasting telematics data indicating the location of the hazard (e.g., geographic coordinates such as latitude and longitude). This data may be received by another device, such as mobile computing device 204.2, for example. When vehicle 202.2 is within a threshold distance of the location of the hazard as specified by the telematics data, aspects include mobile computing device 204.2 likewise issuing an audible and/or visual alert to the driver of vehicle 202.2 to avoid the same hazard.

An insurance provider remote server may adjust an insurance premium or discount based upon an insured having the foregoing functionality, and/or amount that the insured employs or uses that functionality. For instance, the insurance provider remote server may receive the telematics data from an insured mobile computing device, and the telematics data may include an indication of the level of usage of the alert, recommendation, and/or other functionality discussed herein.

Exemplary Method of Sending Alert Notifications

In one aspect, a computer-implemented method for sending alerts indicative of anomalous conditions may be provided. A method may include: (1) receiving, by one or more processors, first and second geographic location data indicative of a geographic location of a first and a second vehicle, respectively; (2) receiving, by one or more processors, first and second telematics data indicative of a motion of the first and the second vehicle, respectively; (3) determining, by one or more processors, whether an anomalous condition (such as vehicle accident, traffic event, traffic jam, congestion, construction, other travel event, etc.) is present at the geographic location of the first vehicle based upon the first telematics data; (4) calculating, by one or more processors, a geographic relationship between the first vehicle and the second vehicle based upon the first and the second geographic location data; and/or (5) sending, by one or more processors, an alert indicative of the anomalous condition (and/or alternate route avoiding the anomalous condition) to the second vehicle when (i) the one or more processors determine that the anomalous condition is present at the geographic location of the first vehicle, and/or (ii) the geographic relationship between the first and second vehicles satisfies a threshold distance condition such that the risk of an accident or collision involving the second vehicle due to the anomalous condition is alleviated. The threshold condition may include, for example, the second vehicle and the first vehicle being within a threshold distance of one another.

Additionally or alternatively, (1) the first and second geographic location data may be received via a first and a second mobile computing device travelling within the first and the second vehicle, respectively; and/or (2) the first and second telematics data may be received via the first and the second mobile computing device, respectively.

The first and/or second telematics data may include data, for example, regarding acceleration, braking, gyroscope, compass heading, turning, and speed information for the first and the second vehicle, respectively. In various aspects, the telematics data may include (1) a timestamp; (2) one or more sensor metrics indicative of braking motion of the first vehicle; (3) one or more sensor metrics indicative of acceleration motion of the first vehicle; (4) one or more sensor metrics indicative of cornering motion of the first vehicle; (5) one or more sensor metrics indicative of a direction of the first vehicle; (6) one or more sensor metrics indicative of a usage of the first mobile computing device; (7) a battery level associated with the first mobile computing device; and/or (8) a usage indicator associated with the first mobile computing device.

Furthermore, the determination of whether the anomalous condition is present at the geographic location of the first vehicle may include determining whether a speed of the first vehicle is less than a threshold speed. Additionally or alternatively, the method may include calculating, by one or more processors, a geofenced area around the first vehicle, and the threshold distance condition may be satisfied when the second vehicle is located within the geofenced area and/or when the second vehicle is within a threshold distance of the first vehicle.

The method may also include determining, by one or more processors, a population density corresponding to the geographic location of the first vehicle based upon the first telematics data, and/or adjusting, by one or more processors, the geofenced area based upon the population density.

Additionally, the method may include identifying an insured customer having a mobile computing device or a vehicle configured with a Telematics Application. The mobile computing device and/or the vehicle may use the Telematics Application to collect telematics data. Additionally or alternatively, the Telematics Application may have risk mitigation and/or prevention functionality that utilizes telematics data of the vehicle or other vehicles. The method may include adjusting an insurance policy, premium, or discount for the insured customer based upon the insured customer having a mobile computing device or a vehicle equipped with the Telematics Application or risk mitigation or prevention functionality that utilizes the telematics data Additionally or alternatively, once the insurance customer is identified, the method may include monitoring a usage amount associated with the insured customer driving an insured vehicle while the telematics data-based risk mitigation or prevention functionality is being performed on the mobile computing device or vehicle and adjusting an insurance policy, premium, or discount for the insured customer based upon the usage amount.

The method may include generating an alternate route for a vehicle that avoids the anomalous condition by comparing the location (e.g., GPS location) of the anomalous condition with the current GPS or other location, current route, and/or current destination of the vehicle. The method may include displaying the alternate route to a driver of the vehicle, such as on a navigation unit of the vehicle and/or navigation or map-based application of a mobile device associated with the driver. The method may include additional, less, or alternate actions, including those discussed elsewhere herein.

Exemplary Non-Transitory Computer Readable Medium

In another aspect, a non-transitory, tangible computer-readable medium storing machine readable instructions for generating alerts is described that, when executed by a processor, cause the processor to: (1) receive first and second geographic location data indicative of a geographic location of a first and a second vehicle, respectively; (2) receive first and second telematics data indicative of a motion of the first and the second vehicle, respectively; (3) determine whether an anomalous condition is present at the geographic location of the first vehicle based upon the first telematics data; (4) calculate a geographic relationship between the first vehicle and the second vehicle based upon the first and the second geographic location data; and/or (5) send an alert indicative of the anomalous condition to the second vehicle when (i) the one or more processors determine that the anomalous condition is present at the geographic location of the first vehicle, and/or (ii) the geographic relationship between the first and second vehicles satisfies a threshold distance condition to alleviate risk of vehicle collision or accident due for the second vehicle to the anomalous condition. The threshold condition may include, for example, the second vehicle and the first vehicle being within a threshold distance of one another. The computer-readable instructions may include additional, less, or alternate functionality, including that discussed elsewhere herein.

For instance, the first and second geographic location data may be received from a first and a second mobile computing device travelling within the first and the second vehicle, respectively, while the first and second telematics data may also be received from the first and the second mobile computing device, respectively.

In various aspects, the telematics data may include data, for example, regarding acceleration, braking, gyroscope, compass heading, turning, and speed information for the first and the second vehicle, respectively. In some embodiments, the telematics data may include (1) a timestamp; (2) one or more sensor metrics indicative of braking motion of the first vehicle; (3) one or more sensor metrics indicative of acceleration motion of the first vehicle; (4) one or more sensor metrics indicative of cornering motion of the first vehicle; (5) one or more sensor metrics indicative of a direction of the first vehicle; (6) one or more sensor metrics indicative of a usage of the first mobile computing device; (7) a battery level associated with the first mobile computing device; and/or (8) a usage indicator associated with the first mobile computing device.

Furthermore, the non-transitory media may further include instructions that, when executed by a processor, cause the processor to determine whether the anomalous condition is present at the geographic location of the first vehicle by determining whether a speed of the first vehicle is less than a threshold speed. Additionally or alternatively, the non-transitory media may further include instructions that, when executed by a processor, cause the processor to calculate a geofenced area around the first vehicle, and the threshold distance condition may be satisfied when the second vehicle is located within the geofenced area and/or when the second vehicle is within a threshold distance of the first vehicle.

The non-transitory media may further include instructions that, when executed by a processor, cause the processor to determine a population density corresponding to the geographic location of the first vehicle based upon the first telematics data and to adjust the geofenced area based upon the population density.

Additionally, the non-transitory media may further include instructions that, when executed by a processor, cause the processor to identify an insured customer having a mobile computing device or a vehicle configured with a Telematics Application. The mobile computing device and/or the vehicle may use the Telematics Application to collect telematics data. Additionally or alternatively, and the Telematics Application may have risk mitigation and/or prevention functionality that utilizes telematics data of the vehicle or other vehicles. The non-transitory media may further include instructions that, when executed by a processor, cause the processor to adjust an insurance policy, premium, or discount for the insured customer based upon the insured customer having a mobile computing device or a vehicle equipped with the Telematics Application or risk mitigation or prevention functionality that utilizes the telematics data.

Additionally or alternatively, once the insurance customer is identified, the non-transitory media may further include instructions that, when executed by a processor, cause the processor to monitor a usage amount associated with the insured customer driving an insured vehicle while the telematics data-based risk mitigation or prevention functionality is being performed on the mobile computing device or vehicle, and adjusting an insurance policy, premium, or discount for the insured customer based upon the usage amount.

Exemplary Mobile Computing Device

In yet another aspect, a first mobile computing device is described that may be located within a first vehicle and include (1) a communication unit configured to receive (i) telematics data from a second mobile computing device indicative of a motion of a second vehicle in which the second mobile computing device is located, and/or (ii) geographic location data indicative of a location of the second vehicle; and/or (2) a processor configured to: (i) determine whether an anomalous traffic condition is present at the geographic location of the second vehicle based upon the geographic location data; (ii) determine a geographic location of the first mobile computing device; (iii) calculate a geographic relationship between the first vehicle and the second vehicle based upon the geographic location data and the geographic location of the first mobile computing device; and/or (iv) generate an alert indicative of the anomalous traffic condition when the processor determines that the anomalous condition is present at the geographic location of the second vehicle, and/or the geographic relationship between the first and second vehicles satisfies a threshold distance condition to facilitate safer driving, warning drivers of the anomalous condition, and/or reducing a risk of vehicle collisions. The threshold condition may include, for example, the second vehicle and the first vehicle being within a threshold distance of one another. The mobile computing device may include additional, less, or alternate functionality, including that discussed elsewhere herein.

For instance, the telematics data and/or the geographic location data may be received in accordance with (1) peer-to-peer communications between the first mobile computing device and the second mobile computing device; and/or (2) network communications between the first mobile computing device and the second mobile computing device via an external computing device. Furthermore, in various aspects, the telematics data may include data, for example, regarding acceleration, braking, gyroscope, compass heading, turning, and speed information for the first and the second vehicle, respectively. In various aspects, the telematics data may include (1) a timestamp; (2) one or more sensor metrics indicative of braking motion of the first vehicle; (3) one or more sensor metrics indicative of acceleration motion of the first vehicle; (4) one or more sensor metrics indicative of cornering motion of the first vehicle; (5) one or more sensor metrics indicative of a direction of the first vehicle; (6) one or more sensor metrics indicative of a usage of the first mobile computing device; (7) a battery level associated with the first mobile computing device; and/or (8) a usage indicator associated with the first mobile computing device.

Additionally or alternatively, the processor of the first mobile computing device may be configured to determine whether the anomalous traffic condition is present at the geographic location of the first vehicle based upon whether a speed of the first vehicle is less than a threshold speed. Still further, the processor of the first mobile computing device may be further configured to calculate a geofenced area around the second vehicle, and the threshold distance condition may be satisfied when the second vehicle is located within the geofenced area. The threshold distance condition may also be satisfied when the second vehicle is within a threshold distance of the first vehicle, regardless of whether a geofence is calculated. When a geofence is calculated, the processor of the first mobile computing device may also be configured to determine a population density corresponding to the geographic location of the second vehicle, and to adjust the geofenced area based upon the population density.

Insurance Applications

As noted herein, the present embodiments may be used to adjust, update, and/or generate insurance policies. Insurance policies, such as auto, usage-based, home, and/or household insurance policies, may be adjusted, updated, and/or generated for insureds or potential customers that have mobile devices and/or vehicles that are equipped or configured with one or more of the functionalities discussed herein.

For instance, insureds or family members may have mobile devices and/or vehicle that are configured to receive telematics data associated with other vehicles and/or abnormal road or travel conditions that other drivers are experiencing. The telematics may be received directly from other vehicles, or indirectly from smart infrastructure and/or insurance provider remote servers. As a result, the insureds and/or their family members may be timely notified of traffic or travel events and then may take alternate routes (or even not drive or delay driving) to lower their risk of getting in an accident due to the traffic or travel events. An insurance provider may promote or reward such risk averse behavior and/or safer driving with lower insurance premiums, rates, and/or increased discounts, such as for usage-based or other types of auto insurance.

Furthermore, an insurance provider may promote or reward the use of one or more aspects described herein with lower insurance premiums, rates, and/or increased discounts. For example, an insurer may provide discounts or other incentives upon an insured customer installing an application to their mobile computing device that enables the mobile computing device to broadcast telematics data and/or to generate alert notifications based upon telematics data received from other devices.

Additionally or alternatively, an insurer may provide discounts or other incentives upon an amount that an insured customer uses the telematics application on their mobile computing device that enables the mobile computing device to broadcast telematics data and/or to generate alert notifications based upon telematics data received from other devices. Such usage-based discounts or incentives may be based upon amount of time of, or number of miles of, use or usage, e.g., an amount of time or miles that the insured drove during a specific period with a Telematics App running or executing on their mobile device (which was located within the insured vehicle as it travels), the Telematics App configured to collect and broadcast telematics data, and/or to receive telematics data from other vehicles or devices, and generate alerts or recommendations based upon the data received.

ADDITIONAL CONSIDERATIONS

With the foregoing, an insurance customer may opt-in to a rewards, insurance discount, or other type of program. After the insurance customer provides their affirmative consent, an insurance provider telematics application and/or remote server may collect telematics and/or other data (including image or audio data) associated with insured assets, including before, during, and/or after an insurance-related event or vehicle collision. In return, risk averse drivers, and/or vehicle owners may receive discounts or insurance cost savings related to auto, home, life, and other types of insurance from the insurance provider.

In one aspect, telematics data, and/or other data, including the types of data discussed elsewhere herein, may be collected or received by an insured's mobile device or smart vehicle, a Telematics App (including those discussed herein), and/or an insurance provider remote server, such as via direct or indirect wireless communication or data transmission from a Telematics App running on the insured's mobile device, after the insured or customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk driving behavior and/or technology that mitigates or prevents risk to (i) insured assets, such as vehicles or even homes, and/or (ii) vehicle operators or passengers.

Although the disclosure provides several examples in terms of two vehicles, two mobile computing devices, two on-board computers, etc., aspects include any suitable number of mobile computing devices, vehicles, etc. For example, aspects include an external computing device receiving telematics data and/or geographic location data from a large number of mobile computing devices (e.g., 100 or more), and issuing alerts to those mobile computing devices in which the alerts are relevant in accordance with the various techniques described herein.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed:

1. A computer-implemented method, comprising:
receiving, by one or more processors, telematics data from a first vehicle; and
in response to the one or more processors determining, based upon the telematics data, that (i) an anomalous condition is present at the geographic location of the first vehicle, and (ii) a calculated geographic relationship between the first vehicle and a second vehicle satisfies a threshold distance condition, wirelessly transmitting, by the one or more processors, an alert indicative of the anomalous condition to a computing device associated with the second vehicle,
wherein the alert alleviates a risk of the second vehicle experiencing a physical vehicle collision as a result of the anomalous condition.

2. The computer-implemented method of claim 1, wherein the act of receiving the telematics data comprises:
receiving first telematics data from a first mobile computing device that is travelling within the first vehicle.

3. The computer-implemented method of claim 1, wherein the telematics data includes data selected from one or more of, and not limited to all of:
a timestamp;
one or more sensor metrics indicative of braking motion of the first vehicle;
one or more sensor metrics indicative of acceleration motion of the first vehicle;
one or more sensor metrics indicative of cornering motion of the first vehicle; and
one or more sensor metrics indicative of a direction of the first vehicle.

4. The computer-implemented method of claim 1, wherein the act of determining whether an anomalous condition is present at the geographic location of the first vehicle comprises:
determining whether a speed of the first vehicle is less than a threshold speed.

5. The computer-implemented method of claim 1, further comprising:
calculating, by one or more processors, a geofence around the first vehicle, and
wherein the calculated geographic relationship between the first and the second vehicle satisfies the threshold distance condition when the second vehicle is located within the geofence around the first vehicle.

6. The computer-implemented method of claim 1, further comprising:
adjusting, by one or more processors; the threshold distance condition based upon a calculated population density corresponding to the geographic location of the first vehicle or the second vehicle.

7. The computer-implemented method of claim 1, wherein the calculated geographic relationship between the first and the second vehicle satisfies the threshold distance condition when the second vehicle is located less than a threshold distance from the first vehicle.

8. The computer-implemented method of claim 1, wherein the computing device associated with the second vehicle is a mobile computing device, the method further comprising:
identifying, by one or more processors, an insured customer associated with the mobile computing device; and
adjusting, by one or more processors, an insurance policy, premium, or discount for the insured customer based upon the mobile computing device being configured to receive transmitted alerts indicative of anomalous conditions.

9. The computer-implemented method of claim 1; wherein the computing device associated with the second vehicle is a mobile computing device, the method further comprising:
identifying, by one or more processors, an insured customer associated with the mobile computing device;
monitoring, by one or more processors, a usage amount associated with the insured customer driving the second vehicle while the mobile computing device is configured to receive transmitted alerts indicative of anomalous conditions; and
adjusting, by one or more processors; an insurance policy, premium, or discount for the insured customer based upon the usage amount.

10. A non-transitory, tangible computer-readable medium storing machine readable instructions for generating alerts that, when executed by a processor, cause the processor to:
receive telematics data from a first vehicle; and
wirelessly transmit, in response to the one or more processors determining, based upon the telematics data, that (i) an anomalous condition is present at the geographic location of the first vehicle, and (ii) a calculated geographic relationship between the first vehicle and a second vehicle satisfies a threshold distance condition, an alert indicative of the anomalous condition to a computing device associated with the second vehicle,
wherein the alert warns a driver of the second vehicle of the anomalous condition to reduce a risk of the second vehicle experiencing a physical vehicle collision as a result of the anomalous condition.

11. The non-transitory; tangible computer-readable medium of claim 10, wherein the instructions to receive the telematics data include instructions that, when executed by the processor; cause the processor to:
receive first telematics data from a first mobile computing device that is travelling within the first vehicle.

12. The non-transitory, tangible computer-readable medium of claim 10, wherein the telematics data includes data selected from one or more of, and not limited to all of:
a timestamp;
one or more sensor metrics indicative of braking motion of the first vehicle;
one or more sensor metrics indicative of acceleration motion of the first vehicle;
one or more sensor metrics indicative of cornering motion of the first vehicle;
one or more sensor metrics indicative of a direction of the first vehicle.

13. The non-transitory, tangible computer-readable medium of claim 10, wherein the instructions to determine whether the anomalous condition is present at the geographic location of the first vehicle include instructions that, when executed by the processor, cause the processor to determine whether a speed of the first vehicle is less than a threshold speed.

14. The non-transitory, tangible computer-readable medium of claim 10, further including instructions that, when executed by the processor, cause the processor to:
calculate a geofence around the first vehicle, and
wherein the instructions to generate the alert further include instructions that, when executed by the processor, cause the processor to determine that the threshold distance condition is satisfied when the second vehicle is located within the geofence around the first vehicle.

15. The non-transitory, tangible computer-readable medium of claim 10, further including instructions that, when executed by the processor, cause the processor to:
adjust the threshold distance condition based upon a calculated population density corresponding to the geographic location of the first vehicle or the second vehicle.

16. The non-transitory, tangible computer-readable medium of claim 10, wherein the instructions to generate the alert further include instructions that, when executed by the processor, cause the processor to determine that the threshold distance condition is satisfied when the second vehicle is located less than a threshold distance from the first vehicle.

17. A first mobile computing device located within a first vehicle, comprising:
- one or more sensors configured to capture telematics data associated with the first vehicle;
- a communication unit configured to receive telematics data from a second mobile computing device located within a second vehicle; and
- a processor configured to determine whether an anomalous condition is present at the geographic location of the first vehicle based upon the captured telematics data associated with the first vehicle,
- wherein the communication unit is further configured to generate an alert indicative of the anomalous condition in response to (i) the processor determining that the anomalous condition is present at the geographic location of the first vehicle, and (ii) a calculated geographic relationship between the first and second vehicle satisfies a threshold distance condition, and
- wherein the communication unit is further configured to wirelessly transmit the alert to the second mobile computing device located within the second vehicle.

18. The first mobile computing device of claim 17, wherein the communication unit is further configured to receive the data via (i) peer-to-peer communications between the first mobile computing device and a second mobile computing device located within the second vehicle, or (ii) network communications between the first mobile computing device and the second mobile computing device.

19. The first mobile computing device of claim 17, wherein the processor is further configured to adjust the threshold distance condition based upon a calculated population density corresponding to the geographic location of the first vehicle or the second vehicle.

20. The first mobile computing device of claim 17, wherein the processor is further configured to determine whether the anomalous condition is present at the geographic location of the second vehicle based upon whether a speed of the second vehicle is less than a threshold speed.

* * * * *